(12) United States Patent
Jo et al.

(10) Patent No.: US 10,712,928 B2
(45) Date of Patent: Jul. 14, 2020

(54) METHOD FOR PROVIDING VISUAL EFFECTS ACCORDING TO BEZEL-BASED INTERACTION AND ELECTRONIC DEVICE FOR SAME

(71) Applicant: Samsung Electronics Co., Ltd., Gyeonggi-do (KR)

(72) Inventors: Hankyung Jo, Seoul (KR); Minsun Kim, Seoul (KR); Sora Kim, Gyeonggi-do (KR); Pilwon Kim, Seoul (KR); Hyunjoo Kim, Seoul (KR); Kwangha Jeon, Gyeonggi-do (KR); Jung-Won Choi, Seoul (KR); Seung Hwan Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 15/690,678

(22) Filed: Aug. 30, 2017

(65) Prior Publication Data
US 2018/0059897 A1 Mar. 1, 2018

(30) Foreign Application Priority Data
Aug. 30, 2016 (KR) .................. 10-2016-0110899

(51) Int. Cl.
*G06F 3/048* (2013.01)
*G06F 3/0487* (2013.01)
(Continued)

(52) U.S. Cl.
CPC .......... *G06F 3/0487* (2013.01); *G04B 19/283* (2013.01); *G04C 3/005* (2013.01);
(Continued)

(58) Field of Classification Search
CPC .......... G06F 3/0481; G06F 3/01; G06F 3/016; G06F 3/017
See application file for complete search history.

(56) References Cited

U.S. PATENT DOCUMENTS

2002/0101457 A1 8/2002 Lang
2009/0285383 A1* 11/2009 Tsuei .................. G06F 3/04883
                                                       379/242
(Continued)

FOREIGN PATENT DOCUMENTS

EP   2 120 436   11/2009
EP   2 733 598    5/2014
(Continued)

OTHER PUBLICATIONS

Make & receive a call on your LG G5 | AT&T Youtube video screen caps "LG_G5.pdf" 3 pages. www.youtube.com/watch?v=6KfAeRVTc3g, published Apr. 18, 2016 (Year: 2016)*
(Continued)

*Primary Examiner* — Haoshian Shih
(74) *Attorney, Agent, or Firm* — The Farrell Law Firm, P.C.

(57) ABSTRACT

An electronic device and a method of operating the electronic device are provided. The electronic device includes a rotating input module, a display, and a processor configured to detect an event, detect an interaction by the rotating input module, determine a first object associated with the event based on the interaction, and display, on the display, a visual effect associated with the first object.

20 Claims, 18 Drawing Sheets

(51) Int. Cl.
    *G06F 1/16*     (2006.01)
    *G04C 3/00*     (2006.01)
    *G04B 19/28*    (2006.01)
    *G04G 21/00*    (2010.01)
    *G06F 3/0362*   (2013.01)
    *G06F 3/0482*   (2013.01)
    *G04G 21/04*    (2013.01)

(52) U.S. Cl.
    CPC ............. *G04G 21/00* (2013.01); *G06F 1/163* (2013.01); *G06F 3/0362* (2013.01); *G06F 3/0482* (2013.01); *G04G 21/04* (2013.01)

(56) References Cited

U.S. PATENT DOCUMENTS

| | | | |
|---|---|---|---|
| 2010/0146463 | A1 | 6/2010 | Cho et al. |
| 2013/0159915 | A1 | 6/2013 | Kim et al. |
| 2016/0091867 | A1 | 3/2016 | Mansour et al. |
| 2016/0170608 | A1 | 6/2016 | Zambettl et al. |
| 2016/0196419 | A1* | 7/2016 | Kuscher ................. G06F 21/36 715/741 |
| 2016/0239142 | A1 | 8/2016 | Kim et al. |
| 2017/0038845 | A1* | 2/2017 | Chi ........................ H04B 1/385 |
| 2017/0090572 | A1* | 3/2017 | Holenarsipur ........ G06F 3/0362 |
| 2017/0371431 | A1 | 12/2017 | Kim et al. |

FOREIGN PATENT DOCUMENTS

| | | |
|---|---|---|
| KR | 101333211 | 12/2013 |
| KR | 101380992 | 4/2014 |
| KR | 101393733 | 5/2014 |
| KR | 101404931 | 6/2014 |
| KR | 101520806 | 5/2015 |
| KR | 20150064432 | 6/2015 |
| WO | WO 2016-108537 | 7/2016 |

OTHER PUBLICATIONS

International Search Report dated Nov. 27, 2017 issued in counterpart application No. PCT/KR2017/009478, 10 pages.
European Search Report dated Dec. 19, 2017 issued in counterpart application No. 17188499.2-1879, 7 pages.
Combination with Galaxy Note 4, S view cover! See IT/Smart Accessory 14.11.25, http://seeit.kr/1778, pp. 25.

* cited by examiner

METHOD FOR PROVIDING VISUAL EFFECTS ACCORDING TO BEZEL-BASED INTERACTION AND ELECTRONIC DEVICE FOR SAME

PRIORITY

This application claims priority under 35 U.S.C. § 119(a) to Korean Patent Application Serial No. 10-2016-0110899, which was filed in the Korean Intellectual Property Office on Aug. 30, 2016, the entire content of which is incorporated herein by reference.

BACKGROUND

1. Field of the Disclosure

The present disclosure relates generally to a method and apparatus for providing a visual effect according to a bezel-based interaction.

2. Description of the Related Art

Recently, with the development of digital technologies, various types of electronic devices have been widely utilized, such as mobile communication terminals, personal digital assistants (PDA), electronic organizers, smart phones, tablet personal computers (PC), wearable devices, and the like. Further, there have been continuous improvements in hardware parts and/or software parts of the electronic device in order to support and increase functions.

The wearable device, which may be utilized by directly being worn on a user's body, may be provided in various forms that may be detachable from a user's body or clothes, such as a head-mounted display (HMD), smart glasses, a smart watch or wristband, a contact lens-type device, a ring-type device, a shoe-type device, a clothes-type device, a glove-type device, etc. The wearable device can be used by being connected with an electronic device. A watch-type wearable device may include a rotary, which is disposed in the exterior of the device and is rotatable, so that a menu or an item displayed on a display unit may be shifted by rotating the rotary.

SUMMARY

The present disclosure has been made to address at least the above-mentioned problems and/or disadvantages and to provide at least the advantages described below.

Accordingly, an aspect of the present disclosure is to provide a method and apparatus that provides visual effects according to a bezel-based interaction, thereby enabling a user to intuitively determine that a function is executed.

Accordingly, another aspect of the present disclosure is to provide a visual effect according to a bezel-based interaction, so that a user can intuitively determine whether a function is executed.

Accordingly, another aspect of the present disclosure is to provide various visual effects according to a bezel-based interaction, so that real-time feedback may be provided based on a user input.

Accordingly, another aspect of the present disclosure is to execute plurality of functions based on a rotation direction of a bezel-based interaction.

Accordingly, another aspect of the present disclosure is to variably change displayed information according to an amount of rotation of a bezel-based interaction (e.g., a rotation angle and a rotation distance).

In accordance with an aspect of the present disclosure, an electronic device is provided. The electronic device includes a rotating input module, a display, and a processor configured to detect an event, detect an interaction by the rotating input module, determine a first object associated with the event based on the interaction, and display, on the display, a visual effect associated with the first object.

In accordance with another aspect of the present disclosure, an operation method of an electronic device including a rotating input module is provided. The method includes detecting an event, detecting an interaction by the rotating input module, determining a first object associated with the event based on the interaction, and displaying a visual effect associated with the first object.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
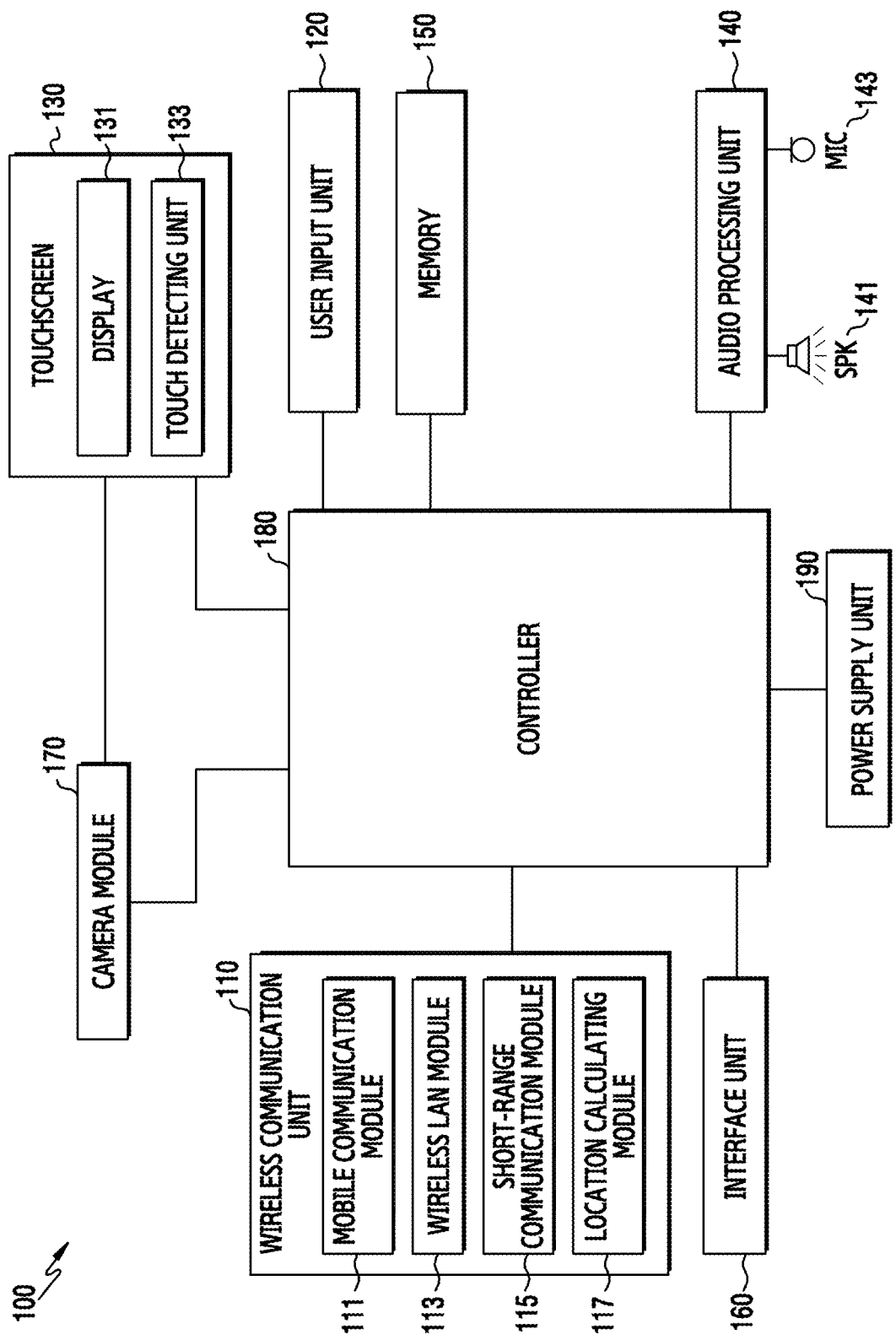
FIG. 1 is a block diagram of a configuration of an electronic device, according to an embodiment of the present disclosure.

Hereinafter, various embodiments of the present disclosure will be described with reference to the accompanying drawings, in which similar reference numerals may be used to designate similar constituent elements. However, it should be understood that there is no intent to limit the present disclosure to the particular forms disclosed herein; rather, the present disclosure should be construed to cover various modifications, equivalents, and/or alternatives of the embodiments described herein.

The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

According to an embodiment of the present disclosure, an electronic device may include a communication device, a multimedia device, and a wearable device that support functions (for example, display functions) according to various embodiments of the present disclosure. The electronic device of the present application may include various processors such as an application processor (AP), a graphic processing unit (GPU), and a central processing unit (CPU).

For example, the electronic device may include at least one of a smartphone, a tablet PC, a mobile phone, a video phone, an electronic book (e-book) reader, a desktop PC, a laptop PC, a netbook computer, a PDA, a portable multimedia player (PMP), an MP3 player, a mobile medical appliance, a camera, and a wearable device (e.g., a smart glasses, an HMD, etc.), or a smart watch).

Further, the electronic device may include a smart home appliance. The home appliance may include at least one of a television, a digital versatile disk (DVD) player, a refrigerator, an air conditioner, a vacuum cleaner, a washing machine, a set-top box, a home automation control panel, a TV box (e.g., Samsung HomeSync™, Apple TV™, or Google TV™), a game console (e.g., Xbox™ or PlayStation™), and an electronic photo frame.

Further, the electronic device may include at least one of a navigation device and an Internet of things (IoT) device.

The electronic device may be a flexible device.

The electronic device may be a combination of one or more of the aforementioned various devices. Further, the electronic device is not limited to the aforementioned devices, and may include a new electronic device according to future technology developments.

The term "user" as used herein may refer to a person who uses an electronic device or a device (e.g., artificial intelligence electronic device) that uses an electronic device.

As described herein, a module or programming module may include at least one of various elements of the present disclosure, exclude some of the elements, or may further include other additional elements. The operations performed by the modules, programming module, or other elements may be executed in a sequential, parallel, repetitive, or heuristic manner. Furthermore, some operations may be executed in a different order, may be omitted, or other operations may be added.

Hereinafter, a method and an apparatus for providing a visual effect based on a bezel-based interaction according to embodiments of the present disclosure will be described with reference to the attached drawings. The various embodiments of the present disclosure will be described based on an approach of hardware. However, various embodiments of the present disclosure include a technology that uses both hardware and software and, thus, the various embodiments of the present disclosure do not exclude the perspective of software.

FIG. 1 is a block diagram of a configuration of an electronic device, according to an embodiment of the present disclosure.

Referring to FIG. 1, an electronic device 100 is provided. The electronic device 100 includes a wireless communication unit 110, a user input unit 120, a touchscreen 130, an audio processing unit 140, a memory 150, an interface unit 160, a camera module 170, a controller 180, and a power supply unit 190. The electronic device 100 may include more or fewer elements than the elements of FIG. 1.

The wireless communication unit 110 may include one or more modules that enable wireless communication between the electronic device 100 and an external electronic device. The wireless communication unit 110 may include a module (e.g., a short-range communication module, a long-range communication module, etc.) for performing communication with an external electronic device existing nearby. For example, the wireless communication unit 110 may be configured to include a mobile communication module 111, a wireless local area network (WLAN) module 113, a short-range communication module 115, and a location calculating module 117.

The mobile communication module 111 may transmit/receive a wireless signal to/from at least one of a base station, an external electronic device, and various servers (e.g., an integration server, a provider server, a content server, an Internet server, or a cloud server) on a mobile communication network. The wireless signal may include a voice signal, a data signal, or various types of control signals. The mobile communication module 111 may transmit various pieces of data required for the operations of the electronic device 100 to an external device (e.g., a server or another electronic device), in response to a user's request. The mobile communication module 111 may transmit/receive a wireless signal based on various communication schemes. For example, although not limited thereto, the communication schemes may include long-term evolution (LTE), LTE-advanced (LTE-A), global system for mobile communication (GSM), enhanced data GSM environment (EDGE), code division multiple access (CDMA), wideband CDMA (WCDMA), universal mobile telecommunications system (UMTS), or orthogonal frequency division multiple access (OFDMA).

The wireless LAN module 113 is a module for wireless Internet access and establishing a wireless LAN link with other electronic devices. The WLAN module 113 may be mounted inside or outside the electronic device 100. Wireless Internet technology may include Wi-Fi, wireless broadband (Wibro), world interoperability for microwave access (WiMax), high speed downlink packet access (HSDPA), millimeter wave (mmWave), etc. The WLAN module 113 may interoperate with an external electronic device connected to the electronic device 100 through a network (e.g., a wireless Internet network) and transmit or receive various pieces of data of the electronic device 100 from or to the outside (e.g., an external electronic device or a server). The WLAN module 113 may always maintain an on-state, or may be turned on based on settings of the electronic device 100 or a user input.

The short-range communication module 115 is a module for performing short-range communication. Bluetooth, Bluetooth low energy (BLE), radio frequency identification (RFID), infrared data association (IrDA), ultra-wideband (UWB), Zigbee, near field communication (NFC), etc. may be used as a short-range communication technology. The short-range communication module 115 may interwork with an external electronic device (e.g., an external audible device) that is connected with the electronic device 100 over a network (e.g., a short-range communication network), and may transmit or receive various pieces of data of the electronic device 100 to/from the external electronic device. The short-range communication module 115 may always maintain an on-state, or may be turned on based on settings of the electronic device 100 or a user input.

The location calculating module 117 is a module for obtaining the location of the electronic device 100, and may include a global position system (GPS) module as a representative example. The location calculation module 117 may measure the location of the electronic device 100 through a triangulation principle. For example, the location calculation module 117 may calculate three-dimensional current location information according to a latitude, a longitude, and an altitude by calculating distance information and time information on the location away from three or more base stations and then applying trigonometry to the calculated information. Furthermore, the location calculating module 117 may calculate location information by continuously receiving location information of the electronic device 100 from three or more satellites in real time. The location information of the electronic device 100 may be obtained by various methods.

The user input unit 120 may generate input data for controlling an operation of the electronic device 100 in response to a user input. The user input unit 120 may include at least one input means for detecting various inputs of the user. For example, the user input unit 120 may include a keypad, a dome switch, a physical button, a touch pad (resistive type/capacitive type), a jog & shuttle, a sensor, etc. A part of the user input unit 120 may be embodied on the exterior of the electronic device 100 in a form of a button, or a part or the whole of the user input unit 120 may be embodied as a touch panel. The user input unit 120 may receive a user input for initiating the operation of the electronic device 100 and generate an input signal according to the user input.

The touchscreen 130 is an input/output device that is capable of performing an input function and a display function at the same time. The touchscreen 130 includes a display 131 and a touch detecting unit 133. The touchscreen 130 may provide an input/output interface between the electronic device 100 and a user, may transfer a touch input of the user to the electronic device 100, and may serve as a medium that shows an output from the electronic device 100 to the user. The touchscreen 130 may show a visual output to the user. The visual output may be shown in a form of text, graphics, video, and a combination thereof. The touchscreen 130 may display various screens associated with operations of the electronic device 100, through the display unit 131. The touchscreen 130 may detect an event (e.g., a touch event, a proximity event, a hovering event, or an air gesture event) based on at least one of a touch, hovering, and air gesture by a user through the touch detection unit 133 while a predetermined screen is displayed through the display 131, and transmit an input signal according to the event to the controller 180.

The display 131 may display various pieces of information processed in the electronic device 100. For example, the display 131 may display a user interface (UI) or a graphic UI (GUI) associated with an operation of displaying information associated with a detected event and one or more objects in both sides of the information, and an operation of variably displaying a visual effect associated with an object. The display 131 may support displaying a screen based on a landscape mode, a portrait mode, or a change between the landscape mode and the portrait mode, according to a rotation direction or an orientation of the electronic device 100. The display unit 131 may use various displays. For example, the display 131 may include a bended display which can be bent or folded without any damage due to a paper-thin and flexible substrate.

The bended display may maintain the bent-form while being coupled to a housing (e.g., a body) of the electronic device 100. The electronic device 100 may be embodied as a display device, which can be quite freely folded and unfolded, such as a flexible display, including the bended display. The display 131 may replace a glass substrate surrounding liquid crystal in a liquid crystal display (LCD), a light emitting diode (LED) display, an organic LED (OLED) display, an active matrix OLED (AMOLED) display, or electronic paper, with a plastic film to assign flexibility to be folded and unfolded. The display 131 may be coupled to the electronic device 100 while extending to at least one side (e.g., at least one of the left side, right side, upper side, and lower side) of the electronic device 100.

The touch detecting unit 133 may be mounted on the display 131, and may sense a user input that is in contact with or in proximity to the surface of the touchscreen 130. The touch detection unit 133 may receive a user input for initiating an operation related to the use of the electronic device 100, and may generate an input signal according to the user input. The user input may include a touch event or a proximity event that is input based on at least one of a single-touch, a multi-touch, hovering, and an air gesture. For example, the user input may be input by a tap, a drag, a sweep, a swipe, a flick, a drag & drop, or a drawing gesture (e.g., writing) etc.

The audio processing unit 140 may transmit, to a speaker (SPK) 141, an audio signal input from the controller 180, and may perform a function of transferring an audio signal such as a voice input received from a microphone (MIC) 143 to the controller 180. The audio processing unit 140 may convert voice/sound data into an audible sound to output the audible sound through the speaker 141 under the control of the controller 180, and convert an audio signal, such as a voice, received from the microphone 143, into a digital signal to transfer the digital signal to the controller 180. The audio processing unit 140 may output an audio signal corresponding to a user input according to audio processing information (e.g., an effect sound, a music file, etc.) inserted into data.

The speaker 141 may output audio data received from the wireless communication unit 110 or stored in the memory 150. The speaker 141 may output a sound signal associated with various operations executed by the electronic device 100. Attachable and detachable earphones, a headphone, or a headset may be connected to the speaker 141 of the electronic device 100 through an external port.

The microphone 143 may receive an external sound signal and process the sound signal into electric voice data. Various noise reduction algorithms may be implemented in the microphone 143 to remove noise generated in the process of receiving an external sound signal. The microphone 143 may serve to input an audio stream such as a voice command (e.g., a voice command for initiating an operation of a music application). The microphone 143 may include an embedded microphone that is contained in the electronic device 100, and an external microphone that is connected with the electronic device 100.

The memory 150 may store one or more programs executed by the controller 180 and also perform a function of temporarily storing input/output data. The input/output data may include, for example, video files, image files, picture files, audio files, etc. The memory 150 may store data acquired in real time in a temporary storage device and data, which is decided to be stored, in a storage device which can store the data for a long time.

The memory 150 may store instructions that enable the execution of an operation of detecting an event, an operation of detecting an interaction by a rotating input module, an operation of determining an object associated with the event based on the interaction, and an operation of variably displaying a visual effect associated with the object. The memory 150 may permanently or temporarily store an operating system (OS) of the electronic device 100, a program related to an input and display control using the touchscreen 130, a program related to the control of various operations of the electronic device 100, and various pieces of data generated by the operations of the programs.

The memory 150 may include an extended memory (e.g., an external memory) or an embedded memory. The memory 150 may include at least one of a flash memory type memory, a hard disk type memory, a micro type memory, a card type memory (e.g., a secure digital (SD) card, an extreme digital (XD) card, etc.), a dynamic random access memory (DRAM), a static RAM (SRAM), a read-only memory (ROM), a programmable ROM (PROM), an electrically erasable PROM (EEPROM), a magnetic RAM (MRAM), a magnetic disk, and an optical disk. The electronic device 100 may also operate in relation to a web storage performing a storage function of the memory 150 on the Internet.

The memory 150 may store various pieces of software. For example, software elements may include an operating system software module, a communication software module, a graphic software module, a user interface software module, a moving picture experts group (MPEG) module, a camera software module, and one or more application software modules. Further, since the module, which is an element of software, may be expressed as a set of instructions, the module may also be referred to as an instruction set. The module may also be expressed as a program.

The operating system software module may include various types of software elements for controlling general system operations of the electronic device 100. The control of such general system operations refers to, for example, memory management and control, power management and control, etc. Further, the operating system software module may perform a function of smoothly executing communication between various hardware and software elements.

The communication software module may allow the electronic device 100 to communicate with another electronic device, such as a computer, a server, or a portable terminal through the wireless communication unit 110. Further, the communication software module may be formed in a protocol structure corresponding to a corresponding communication scheme.

The graphic software module may include various software elements for providing and displaying graphics on the touchscreen 130. The term "graphics" includes text, a webpage, an icon, a digital image, a video, an animation, etc.

The user interface software module may include various software elements related to a UI. For example, the user interface software module may include content indicating how a state of the user interface is changed or indicating a condition under which the change in the state of the user interface is made.

The MPEG module may include a software element which enables digital content-related (e.g., video and audio data) processes and functions (e.g., generation, reproduction, distribution, and transmission of contents) thereof.

The camera software module may include a camera-related software element which enables camera-related processes and functions.

The application module may include a web-browser including a rendering engine, an email, an instant message, word processing, keyboard emulation, an address book, a widget, digital right management (DRM), iris scan, context cognition, voice recognition, a location-based service, etc. The interface unit 160 may receive data or power from an external electronic device, and may transfer the same to each element included in the electronic device 100. The interface unit 160 may enable the data inside the electronic device 100 to be transmitted to an external electronic device. For example, the interface unit 160 may include a wired/wireless headset port, an external charger port, a wired/wireless data port, a memory card port, an audio input/output port, a video input/output port, an earphone port, etc.

The camera module 170 supports a function of photographing. The camera module 170 may photograph a subject under the control of the controller 180, and may transfer the photographed data (e.g., an image) to the display 131 and the controller 180. The camera module 170 may include one or more image sensors. For example, the camera module 170 may include a front sensor (e.g., a front camera) disposed in the front of the electronic device 100 and a lateral sensor disposed in the lateral side of the electronic device 100.

The controller 180 may control the overall operation of the electronic device 100. For example, the controller 180 may perform various controls in association with playing music, visually processing a musical property, voice communication, data communication, video communication, etc. The controller 180 may be embodied as one or more processors, or the controller 180 may be referred to as a processor. For example, the controller 180 may include a communication processor (CP), an AP, an interface (e.g., general purpose input/output (GPIO)), or an embedded memory, as separate elements, or may integrate the elements into one or more integrated circuits. The AP may execute various software programs to perform various functions for the electronic device 100, and the CP may process and control voice communication and data communication. Further, the controller 180 may execute a predetermined software module stored in the memory 150 and perform various predetermined functions corresponding to the module.

The controller 180 may detect an event, i.e., an interaction by a rotating input module, may determine an object associated with the event based on the interaction, and may variably display a visual effect associated with the object.

The controller 180 may control various operations related to the general function of the electronic device 100 in addition to the aforementioned functions. For example, when a predetermined application is executed, the controller 180 may control the operation thereof and the display of a screen. Further, the controller 180 may receive input signals corresponding to various touch or proximity event inputs supported by a touch-based or proximity-based input interface (e.g., the touchscreen 130) and may control the execution of functions according to the received input signals. Also, the controller 180 may control the transmission/reception of various data based on wired or wireless communication.

The power supply unit 190 may receive external power and internal power and supply power required for operating the elements under the control of the controller 180. The power supply unit 190 may turn on/off the supply of power to the display unit 131, the camera module 170, etc., under the control of the controller 180.

In some cases, the embodiments described herein may be implemented by the controller 180 itself. From the perspective of software-based implementation, the embodiments such as procedures and functions described herein may be implemented by separate software modules. The software modules may perform one or more functions and operations described herein.

Figure 2:
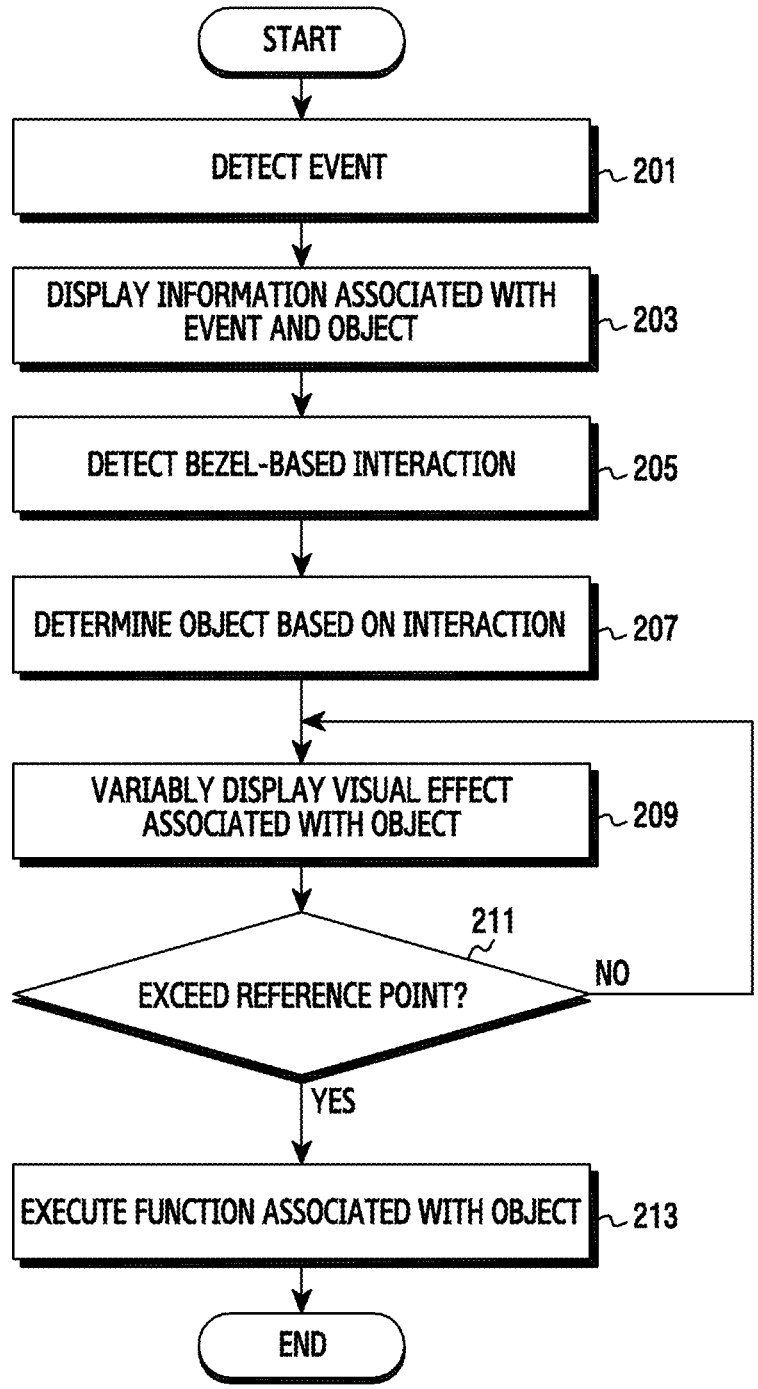
FIG. 2 is a flowchart of a method of operating an electronic device based on a bezel-based interaction, according to an embodiment of the present disclosure.

FIG. 2 is a flowchart of a method of operating an electronic device based on a bezel-based interaction, according to an embodiment of the present disclosure.

Referring to FIG. 2, at step 201, the controller 180 of the electronic device 100 detects an event. The event may be associated with the execution of a function (e.g., a function of an application) of the electronic device 100. For example, the event may be detected by at least one of a function executed by a user input (e.g., a timer, a device search, etc.), a function executed by user settings or electronic device settings (e.g., an alarm), and a function executed by an external input (e.g., a phone call, a push message, etc.).

At step 203, the controller 180 displays an object and information associated with an event. The information associated with an event (hereinafter, event information) may be information associated with a function. The event information may be displayed as at least one of text, an image, an icon, and a video. For example, the event information may be call information (e.g., a caller name or a caller number), alarm information (e.g., an alarm image or an alarm time), calendar information (e.g., a calendar image or a set date), timer information (e.g., a timer image or a timer time), or device search information (e.g., a device search image, a guidance message, a device name, etc.).

An object associated with the event may be an action button associated with the event information. The object may be displayed as at least one of text, an image, an icon, and a video. For example, when the event information is "call information", the object may be a call connection button or a call rejection button. When the event information is "alarm information", the object may be a dismiss alarm button or a snooze button. When the event information is "calendar information", the object may be a dismiss calendar alarm button or a calendar snooze button. When the event information is "timer information", the object may be a timer off button or a timer restart button. When the event information is "device search information", the object may be a search off button or a search restart button.

The controller 180 may display the event information in the center of a display area of the display 131 of the electronic device 100 and may display the object in a lateral side of the display area. For example, when the display 131 is disposed in the front side of the electronic device 100, the controller 180 may display objects on opposite sides (e.g., on the left/right or upper side/lower side) of the display 131 based on the location of the event information. That is, the controller 180 may display the object to not overlap the event information.

For example, when the electronic device 100 is a watch-type wearable device, the controller 180 may display the object in a location corresponding to one of 12 o'clock, 3 o'clock, 6 o'clock, and 9 o'clock locations of the watch. When two objects are displayed, the controller 180 may display one object (e.g., a first object) in a location that faces the location of another object (e.g., a second object). For example, when a first object is disposed at the 3 o'clock location of the watch, a second object may be disposed at the 9 o'clock location of the watch. Alternatively, when a first object is disposed at the 12 o'clock location of the watch, a second object may be disposed at the 6 o'clock location of the watch.

At step 205, the controller 180 detects a bezel-based interaction. The bezel-based interaction may be a user input that rotates a bezel part enclosing the edge of the display 131. A rotating input module may be disposed in the edge of the display 131. The controller 180 may detect a bezel-based interaction corresponding to the rotation of the rotating input module by a user.

At step 207, the controller 180 determines an object based on the bezel-based interaction. Here, the object may be one of the objects displayed in step 203. For example, when the number of the objects displayed in step 203 is one, the controller 180 may determine the object as the one displayed object. Alternatively, when more than one object is displayed in step 203, the controller 180 may select one of the objects based on the interaction. For example, in the case in which a first object is disposed at the 9 o'clock location of the watch and a second object is disposed at the 3 o'clock location, the controller 180 may select the first object when a clockwise interaction is detected (e.g., in a first direction), and may select the second object when a counterclockwise interaction is detected (e.g., in a second direction). Alternatively, the controller 180 may select the second object when a clockwise interaction is detected, and may select the first object when a counterclockwise interaction is detected.

Alternatively, when the first object is disposed at the 12 o'clock location of the watch and the second object is disposed at the 6 o'clock location, the controller 180 may select the first object when a clockwise interaction is detected, and may select the second object when a counterclockwise interaction is detected. Alternatively, the controller 180 may select the second object when a clockwise interaction is detected, and may select the first object when a counterclockwise interaction is detected.

Alternatively, the controller 180 may perform steps 207 to 213 based on a touch input detected on the display 131 instead of based on the bezel-based interaction. For example, the controller 180 may perform steps 207 to 213 based on a touch input that moves (e.g., drags) clockwise or counterclockwise.

At step 209, the electronic device 100 (e.g., the controller 180) may variably display a visual effect associated with the determined (or selected) object. For example, the controller 180 may variably display a visual effect (or visual feedback) based on the bezel-based interaction. The controller 180 may variably display the visual effect by varying at least one of the size, the shape, the transparency, and the color of the visual effect according to the bezel-based interaction. The visual effect may be increased in a direction from the location of the determined object to a reference point (or a threshold value). The visual effect may be decreased in a direction from the reference point to the determined object.

For example, when the first object is located at the 9 o'clock location of the watch and the second object is located at the 3 o'clock location of the watch, the controller 180 may variably display a visual effect associated with the first object according to the rotation angle (or rotation distance) of an interaction that rotates clockwise. For example, the controller 180 may display a visual effect by gradually increasing the size of the first object based on the location of the first object, as the rotation angle of a clockwise rotation increases. Alternatively, the controller 180 may display a visual effect by gradually increasing the size of the second object based on the location of the second object, as the rotation angle of a counterclockwise rotation increases.

The controller 180 may detect a user input for selecting the object, and may variably display the visual effect based on a direction in which the detected user input moves. For example, when the first object is disposed at the 9 o'clock location of the watch and the second object is disposed at the 3 o'clock location, the controller 180 detects a user input for selecting the first object. When a movement, which drags the first object in the direction toward a reference point, is detected, the controller 180 may display the visual effect in the direction toward the reference point based on the location of the first object by varying at least one of the size, the shape, the transparency, and the color thereof.

At step 211, the controller 180 may determine whether the displayed visual effect exceeds a reference point or reference line. The reference point may be set at the central line (or area) of the display 131. The reference point may corresponds to an area located at least 50% of the distance away from a lateral side of the display 131 to the center. For example, when the display 131 is a circular shape, the reference point may be set as the diameter of a circle. The reference point may be set as a line between 12 o'clock and 6 o'clock of a watch or a line between 9 o'clock and 3 o'clock of the watch. The controller 180 may determine whether the visual effect associated with the first object disposed at the 9 o'clock location of the watch gradually increases and exceeds the reference point. As the rotation angle of an interaction increases, the visual effect increases, and thus, the controller 180 may set the reference point in association with the rotation angle. For example, when the rotation angle exceeds a reference angle (e.g., 90 degrees, 130 degrees, 180 degrees, etc.), the controller 180 may determine that the visual effect exceeds the reference point.

When the visual effect exceeds the reference point, the controller 180 performs step 213. When the visual effect does not exceed the reference point, the controller 180 continues to perform step 209.

At step 213, when the visual effect exceeds the reference point, the electronic device 100 (e.g., the controller 180) selects the object and executes a function associated with the selected object. For example, when the event information is call information, the first object disposed at the 9 o'clock location of the watch may be a call connection button, and the second object disposed at the 3 o'clock location of the watch may be a call rejection button. While the visual effect of the first object is displayed in a large size according to an interaction that rotates clockwise, when the rotation angle of the interaction exceeds a reference angle (or when the visual effect of the first object exceeds a reference point), the controller 180 may connect a call. Alternatively, while the visual effect of the second object is displayed in a large size according to an interaction that rotates counterclockwise, when the rotation angle of the interaction exceeds a reference angle (or when the visual effect of the second object exceeds a reference point), the controller 180 may reject a call. Accordingly, the controller 180 may connect or reject a call based on a rotation direction.

Alternatively, when the event information is alarm information, the first object disposed at the 9 o'clock location of the watch may be an alarm dismiss button, and the second object disposed at the 3 o'clock location of the watch may be a snooze button. While the visual effect of the first object is displayed in a large size according to an interaction that rotates clockwise, when the rotation angle of the interaction exceeds a reference angle, the controller 180 may turn off the alarm. Alternatively, while the visual effect of the second object is displayed in a large size according to an interaction that rotates counterclockwise, when the rotation angle of the interaction exceeds a reference angle, the controller 180 may set the alarm to ring again after a predetermined period of time (e.g., 5 minutes or 10 minutes). Accordingly, the controller 180 may turn off the alarm or reset an alarm based on a rotation direction.

Alternatively, when the event information is device search information, an object may be disposed at the 9 o'clock location of the watch and the object may be a search off button. While the visual effect of the object is displayed in a large size according to an interaction that rotates clockwise, when the rotation angle of the interaction exceeds a reference angle, the controller 180 may turn off or interrupt searching for a device.

Alternatively, when the event information is timer information, an object may be disposed at the 9 o'clock location of the watch and the object may be a timer off button. While the visual effect of the object is displayed in a large size according to an interaction that rotates clockwise, when the rotation angle of the interaction exceeds a reference angle, the controller 180 may turn off or interrupt a timer.

Figure 3A:
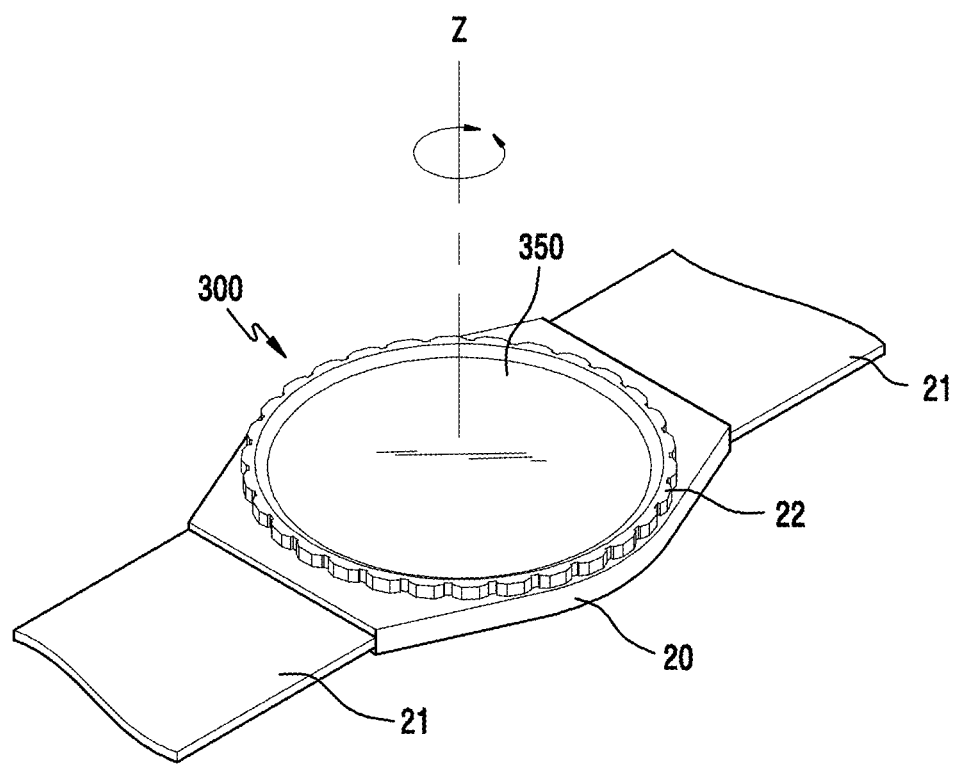
FIGS. 3A and 3B illustrate a method of providing a visual effect using a bezel-based interaction on an electronic device, according to an embodiment of the present disclosure.
Figure 3B:
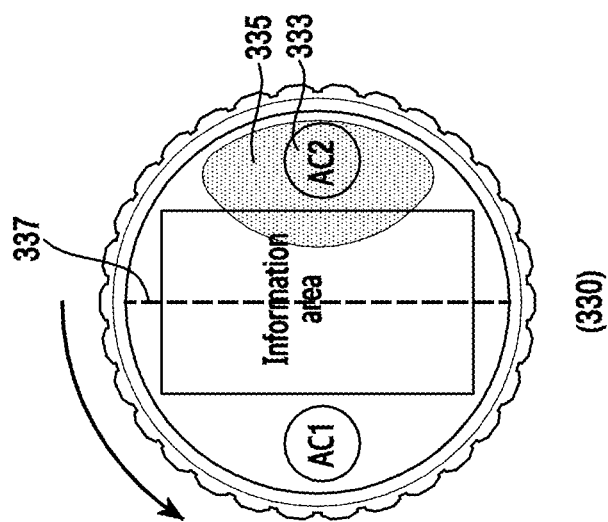
Figure 3B:
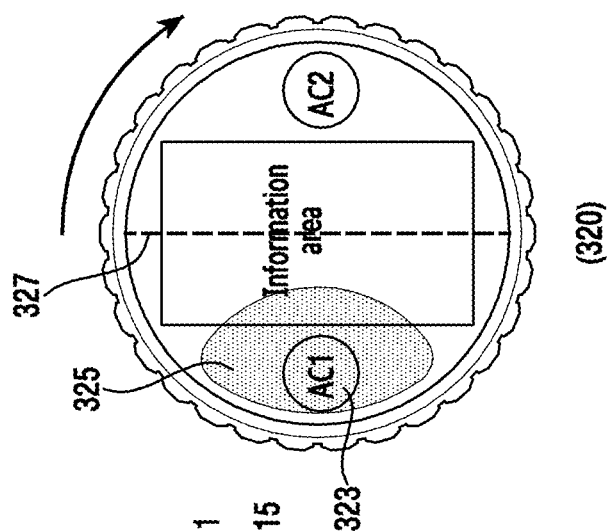
Figure 3B:
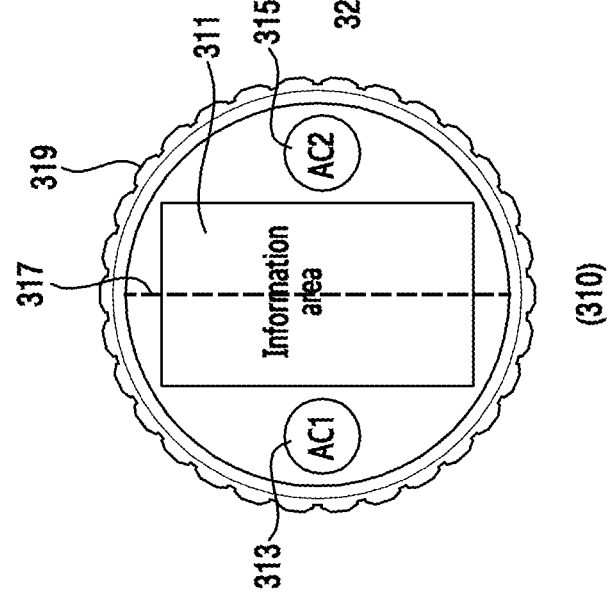

FIGS. 3A and 3B illustrate a method of providing a visual effect using a bezel-based interaction on an electronic device, according to an embodiment of the present disclosure.

Referring to FIGS. 3A and 3B, an electronic device 300 is provided. The electronic device 300 is a wrist-mounted-type wearable device that a user can put on a wrist of the user.

In FIG. 3A, a perspective view of the electronic device 300 is provided. The electronic device 300 includes a housing 20, a connecting part (e.g., a strap) 21, and a rotating input module 22 that is mounted on the housing 20. The electronic device 300 may have a battery (e.g., a rechargeable battery, etc.) therein as a power supply means. The electronic device 300 may be selectively mounted on a portable charging cradle in order to charge the battery.

The housing 20 may include a display 350 and/or at least one key button. The display 350 may include a touchscreen, and may receive a touch input. Although the housing 20 is illustrated in the form of a circular shape, the housing 20 may be formed in various shapes (e.g., a rectangular shape, a polygonal shape, etc.). The rotating input module 22 may be disposed in a bezel part that encloses the edge of the display 350 that is disposed on the top of the housing 20. Alternatively, the rotating input module 22 may be disposed in a lateral side of the housing 20, like a stem of a watch. The rotating input module 22 may or may not be formed to be protruded. The rotating input module 22 may rotate on z-axis clockwise or counterclockwise. The amount of rotation may be limited to a predetermined value (e.g., 360 degrees) or the rotating input module 22 may be configured to rotate unlimitedly.

The connecting part 21 may be formed of at least one material out of metal, leather, rubber, silicone, and urethane. The connecting part 21 may be worn on a predetermined position of a human body, for example, the neck, the ankle, the wrist, etc.

When a user rotates the rotating input module 22, the electronic device 300 may execute various functions based on a rotation parameter of the rotating input module 22. For example, the electronic device 300 may detect a rotation parameter of the rotating input module 22 by using a plurality of rotation recognizing units. For example, the plurality of rotation recognizing units may include an optical sensor that recognizes an optical pattern of the rotating input module 22 and detects a rotation parameter, a magnetism detecting sensor that detects the magnetism of a magnetic contained in the rotating input module 22 and detects a rotation parameter, or other sensors that are capable of detecting a rotation input, such as a hall sensor or the like. Here, the rotation parameter may include at least one of the direction of the rotation of a rotating body, the speed of the rotation, the amount of the rotation, and the location where the rotating body rotates.

While the visual effect of a first object is displayed in a large size according to an interaction that rotates clockwise, when the rotation angle of the interaction exceeds a reference angle, the controller 180 may perform a function associated with the first object (e.g., a call connection function). Alternatively, while the visual effect of a second object is displayed in a large size according to an interaction that rotates counterclockwise, when the rotation angle of the interaction exceeds a reference angle, the controller 180 may perform a function associated with the second object (e.g., a call rejection function).

As shown in FIG. 3B, the controller 180 of the electronic device 300 may display a first user interface 310 including event information and an object associated with an event. The first user interface 310 may include event information 311 (e.g., an information area), a first object 313, and a second object 315. The controller 180 may display the first object 313 and the second object 315 on opposite sides (e.g., left/right sides or upper/lower sides) of the event information 311. In the diagram, it is illustrated that the first object 313 and the second object 315 are disposed on the left and right of the event information 311. The controller 180 may set a reference point 317 based on the locations of the first object 313 and the second object 315. For example, the controller 180 may set a line between 12 o'clock and 6 o'clock of a watch as the reference point 317. Alternatively, the controller 180 may set a reference angle as the reference point 317 based on a rotation angle that controls a visual effect to be close to the reference point 317 The controller 180 may variably display a visual effect associated with the first object 313 or the second object 315 according to a rotation of a rotating input module 319.

The first object 313 and the second object 315 according to various embodiments may be disposed on the upper and lower sides of the event information 311. For example, the first object 313 may be disposed on the 12 o'clock location of the watch, and the second object 315 may be disposed on the 6 o'clock location. In this instance, a reference point may be set as a line between 3 o'clock and 9 o'clock. Although FIG. 3B illustrates two objects displayed in the display 350, additional objects may be displayed. In this instance, the reference point may be set based on the size of a visual effect of each object according to a rotation interaction.

The controller 180 of the electronic device 300 may display a second user interface 320 that displays a visual effect 325 associated with a first object 323 as the rotating input module 319 rotates clockwise. The second user interface 320 may include event information 327, the first object 323, the visual effect 325 associated with the first object 323, and a second object AC2. As the rotation angle of the clockwise rotation increases, the controller 180 may display the visual effect 325 associated with the first object 323 to be larger gradually. As the rotation angle of the clockwise rotation increases, the controller 180 may control the first object 323 to be displayed in a larger size.

The controller 180 may display a third user interface 330 that displays a visual effect 335 associated with a second object 333 as the rotating input module 319 rotates counterclockwise. The third user interface 330 may include event information 337, a first object AC1, the second object 333, and the visual effect 335 associated with the second object 333. As the rotation angle of the counterclockwise rotation increases, the controller 180 may display the visual effect 335 associated with the second object 333 to be larger gradually. As the rotation angle of the counterclockwise rotation increases, the controller 180 may control the second object 333 to be displayed in a larger size.

Figure 4A:
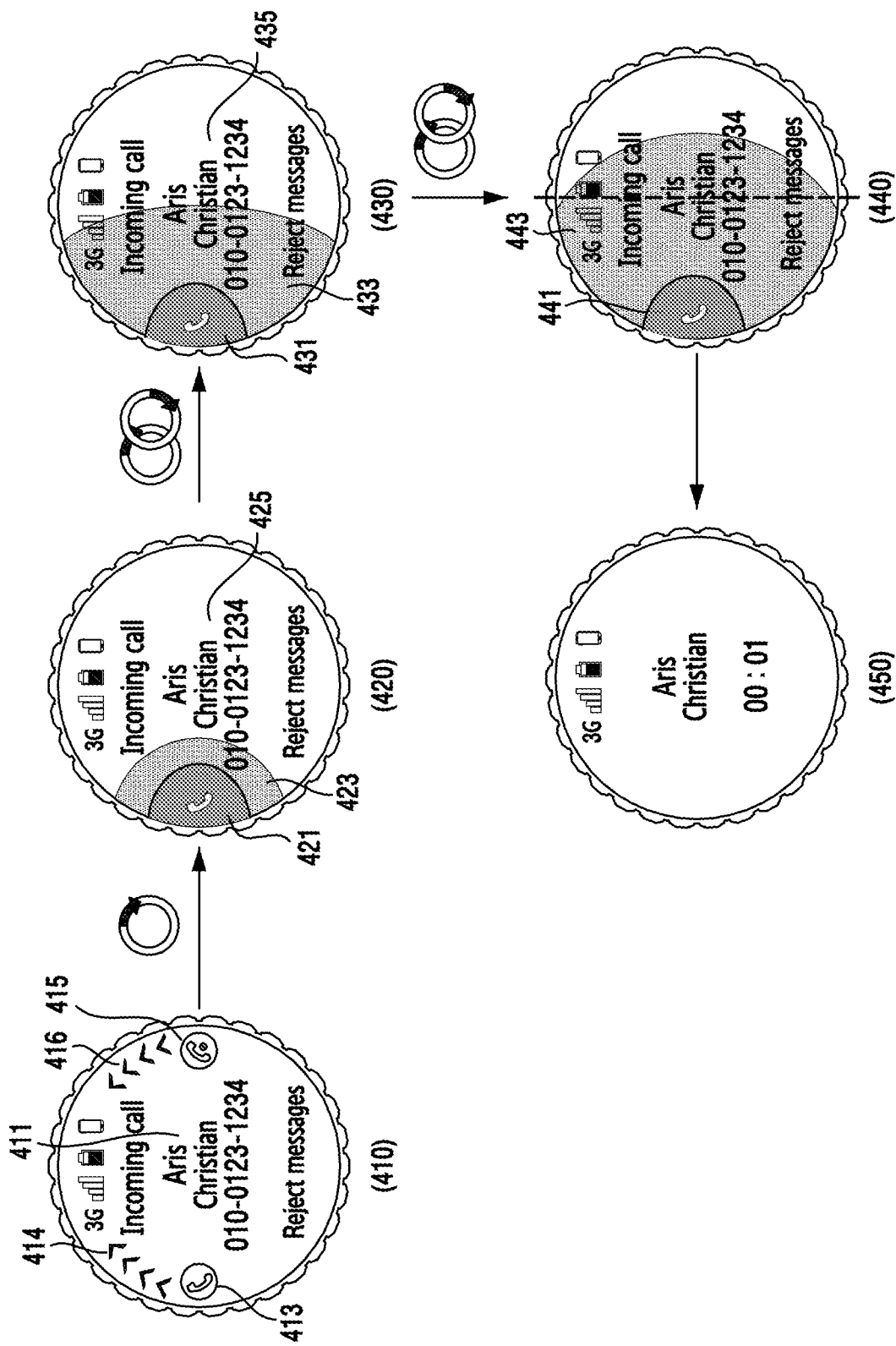
FIGS. 4A and 4B illustrate a method of providing a visual effect using a bezel-based interaction in a phone application, according to an embodiment of the present disclosure.
Figure 4B:
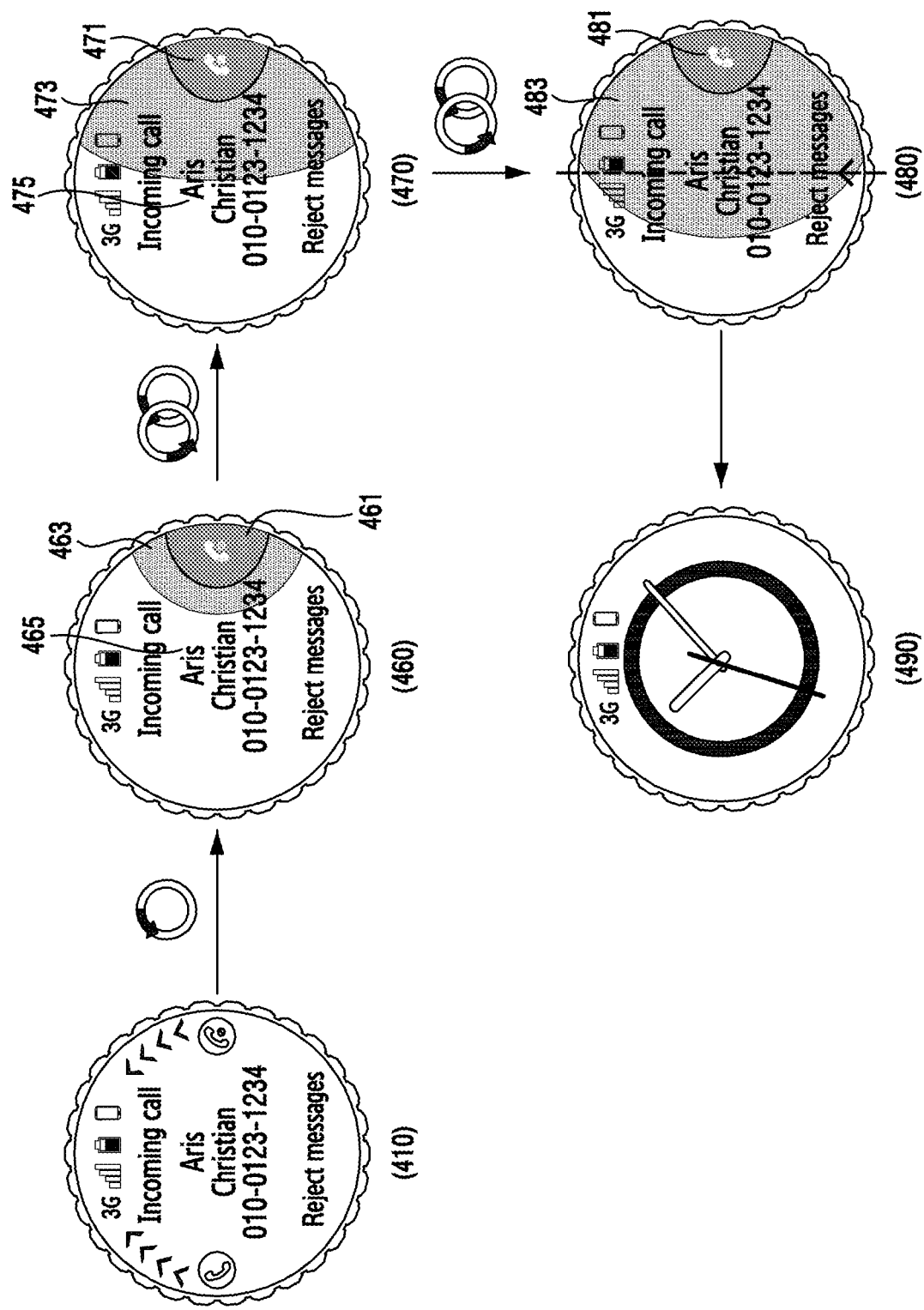

FIGS. 4A and 4B illustrate a method of providing a visual effect using a bezel-based interaction in a phone application, according to an embodiment of the present disclosure.

Referring to FIG. 4A, a method of providing a visual effect associated with a call connection button (e.g., a first object) in a phone application of the electronic device 100 is provided.

The controller 180 of the electronic device 100 may detect that an event occurs when receiving a call from an external electronic device, and may provide a first user interface 410 associated with the event (e.g., a phone call) that has occurred. The first user interface 410 may include call information 411 associated with the call (e.g., event information), a call connection button 413 (e.g., a first object), and a call rejection button 415 (e.g., a second object), the first user interface 410 may further include a call information message (e.g., an incoming call) and information for transmitting a call rejection message (e.g., reject messages). The call information 411 may include the phone number (e.g., "010-0123-1234") of the external electronic device, and a name of the caller (e.g., "Aris Christian"). The caller's name may be displayed when the caller's phone number and the name are registered in the electronic device 100.

The controller 180 may display a cue 414 indicating a rotation direction of the rotating input module 22 to be clockwise for executing the call connection button 413. The cue 414 may intuitively inform a user of a rotation direction for executing the call connection. The controller 180 may also display a cue 416 indicating rotation direction of the rotating input module 22 to be counterclockwise for executing the call rejection button 415. While displaying the first user interface 410, the controller 180 may or may not output a sound or a vibration associated with a call notification according to settings of the electronic device 100 (e.g., when a silent mode is set).

When a bezel-based interaction (e.g., a rotation angle of 30 degrees), which corresponds to the clockwise rotation of the rotating input module 22 by a user, is detected, the controller 180 may provide a second user interface 420. The second user interface 420 may include a call connection button 421, a visual effect 423 associated with the call connection button 421, and call information 425. The controller 180 may remove the call rejection button 415 when an input that rotates clockwise (e.g., a bezel-based interaction for executing the call connection button 421) is detected. Alternatively, although an input that rotates clockwise is detected, the controller 180 may maintain the display of the call rejection button 415, may display the call rejection button 415 to be blurred by controlling the transparency of the call rejection button 415, or may display the call rejection button 415 in a smaller size by reducing the size of the call rejection button 415. In this instance, the controller 180 may determine whether the visual effect 423 exceeds a reference point.

The controller 180 may display the visual effect 423 to overlap a part or the entirety of the call information 425. Also, the controller 180 may change the size of the call connection button 421 to be larger based on a bezel-based interaction. Also, the controller 180 may display the visual effect 423 by varying at least one of the size, the shape, the transparency, and the color of the visual effect 423 according to a bezel-based interaction. For example, as the rotation angle of a clockwise rotation increases, the controller 180 may increase the size of the visual effect 423, change the shape of the visual effect 423 (e.g., a half circle, a circle, an oval, etc.), increase or decrease the transparency of the visual effect 423, or change the color of the visual effect 423 to be brighter or darker. As the size of the visual effect 423 changes, the shape of the visual effect 423 may also change.

When a bezel-based interaction (e.g., a rotation angle of 60 degrees), which corresponds to the clockwise rotation of the rotating input module 22, is continuously detected while the second user interface 420 is displayed, the controller 180 may provide a third user interface 430. The third user interface 430 may include a call connection button 431, a visual effect 433 associated with the call connection button 431, and call information 435. The controller 180 may increase the size of the visual effect 433 of the third user interface 430 to be larger than the visual effect 423 of the second user interface 420, decrease the transparency, and change the color to be darker. Alternatively, the controller 180 may increase the size of the visual effect 433 of the third user interface 430 to be larger than the visual effect 423 of the second user interface 420, decrease the transparency, and change the color to be brighter; may increase the size to be larger, increase the transparency, and change the color to be darker; or may increase the size to be larger, increase the transparency, and change the color to be brighter. In this instance, the controller 180 may determine whether the visual effect 433 exceeds a reference point.

When a bezel-based interaction (e.g., a rotation angle of 90 degrees), which corresponds to the clockwise rotation of the rotating input module 22, is continuously detected while the third user interface 430 is displayed, the controller 180 may provide a fourth user interface 440. The fourth user interface 440 may include a call connection button 441 and a visual effect 443 associated with the call connection button 441. The controller 180 may increase the size of the visual effect 443 of the fourth user interface 440 to be larger than the visual effect 433 of the third user interface 430, decrease or increase the transparency, and change the color to be darker or brighter. In this instance, the controller 180 may determine whether the visual effect 443 exceeds a reference point.

The controller 180 may display call information (e.g., "Aris Christian" and "010-0123-1234") to overlap the visual effect 443 in the fourth user interface 440. In this instance, the call information may not be seen based on the transparency or the color of the visual effect 443. That is, when the transparency is low and the color is dark, the call information may not be seen by being covered with the visual effect 443. Accordingly, the controller 180 may change the location where the call information is displayed, based on the visual effect 443. For example, the controller 180 may change the location where the call information is displayed when the call information is not seen by being covered with the visual effect 443. As the visual effect 443 is changed to be gradually increased from the left to the right, the controller 180 may move the location where the call information is displayed from the left to the right. The controller 180 may change the amount of data included in the call information, based on the visual effect 443. For example, when the visual effect 443 is changed to be gradually increased, the controller 180 may change call information to display only one of a caller's phone number and name.

When the visual effect 443 exceeds a reference point, the controller 180 may execute a function associated with the call connection button 441. For example, when the visual effect 443 associated with the call connection button 441 exceeds a reference point in the fourth user interface 440, the controller 180 may connect a call with the caller corresponding to call information. When the call is connected with the caller, the controller 180 may display a user interface 450 associated with a call connection. The user interface 450 may include a caller's name (e.g., "Aris Christian") and a call time (e.g., "00:01"). The user interface 450 may be an execution screen of a phone application.

Referring to FIG. 4B a method of providing a visual effect associated with a call rejection button (e.g., a second object) in a phone application of the electronic device 100 is provided.

The controller 180 of the electronic device 100 may detect that an event occurs upon receiving a call from a partner electronic device, and may provide the first user interface 410 associated with the event (e.g., a call). The first user interface 410 may include call information associated with the call (e.g., "Aris Christian" and "010-0123-1234"), a call connection button (e.g., a phone icon), and a call rejection button. Also, the first user interface 410 may include a cue indicating the rotation direction of the rotating input module 22 for execution of the call connection button and a cue indicating the rotation direction of the rotating input module 22 for execution of the call rejection button. While displaying the first user interface 410, the controller 180 may or may not output a sound or a vibration associated with a call notification according to settings of the electronic device 100.

When a bezel-based interaction (e.g., a rotation angle of −30 degrees), which corresponds to the counterclockwise rotation of the rotating input module 22 by a user, is detected, the controller 180 may provide a second user interface 460. The second user interface 460 may include a call rejection button 461, a visual effect 463 associated with the call rejection button 461, and call information 465. The controller 180 may remove the call connection button when an input that rotates counterclockwise (e.g., a bezel-based interaction for executing the call rejection button 461) is detected. Alternatively, although an input that rotates counterclockwise is detected, the controller 180 may maintain the display of the call connection button, may display the call connection button to be blurred by controlling the transparency of the call connection button, or may display the call connection button in a smaller size by reducing the size of the call connection button. In this instance, the controller 180 may determine whether the visual effect 463 exceeds a reference point.

The controller 180 may display the visual effect 463 to overlap a part or the entirety of the call information 465. Also, the controller 180 may display the visual effect 463 by varying at least one of the size, the shape, the transparency, and the color of the visual effect 463 according to a bezel-based interaction. For example, as the rotation angle of a counterclockwise rotation increases, the controller 180 may increase the size of the visual effect 463, change the shape of the visual effect 463 (e.g., a half circle, a circle, an oval, etc.), increase or decrease the transparency of the visual effect 463, or change the color of the visual effect 463 to be brighter or darker. As the size of the visual effect 463 changes, the shape of the visual effect 463 may also change.

When a bezel-based interaction (e.g., a rotation angle of −60 degrees), which corresponds to the counterclockwise rotation of the rotating input module 22, is continuously detected while the second user interface 460 is displayed, the controller 180 may provide a third user interface 470. The third user interface 470 may include a call rejection button 471, a visual effect 473 associated with the call rejection button 471, and call information 475. The controller 180 may increase the size of the visual effect 473 of the third user interface 470 to be larger than the visual effect 463 of the second user interface 460, decrease or increase the transparency, and change the color to be darker or brighter. In this instance, the controller 180 may determine whether the visual effect 473 exceeds a reference point.

When a bezel-based interaction (e.g., a rotation angle of −90 degrees), which corresponds to the counterclockwise rotation of the rotating input module 22, is continuously detected while the third user interface 470 is displayed, the controller 180 may provide a fourth user interface 480. The fourth user interface 480 may include a call rejection button 481 and a visual effect 483 associated with the call rejection button 481. The controller 180 may increase the size of the visual effect 483 of the fourth user interface 480 to be larger than the visual effect 473 of the third user interface 470, decrease or increase the transparency, and change the color to be darker or brighter. In this instance, the controller 180 may determine whether the visual effect 483 exceeds a reference point.

The controller 180 according to various embodiments may display call information (e.g., "Aris Christian" and "010-0123-1234") to overlap the visual effect 483 in the fourth user interface 480. In this instance, the call information may not be seen based on the transparency or the color of the visual effect 483. That is, when the transparency is low and the color is dark, the call information may not be seen by being covered with the visual effect 483. Accordingly, the controller 180 may change the location where the call information is displayed, based on the visual effect 483. For example, when the visual effect 483 is changed to be gradually increased from the right to the left, the controller 180 may move the location where the call information is displayed from the right to the left.

When the visual effect 483 exceeds a reference point, the controller 180 may execute a function associated with the call rejection button 481. For example, when the visual effect 483 associated with the call rejection button 481 exceeds a reference point in the fourth user interface 480, the controller 180 may reject a call. When the call is rejected, the controller 180 may interrupt outputting a sound or a vibration associated with a call notification, remove a user interface associated with a call (e.g., the first user interface 410), and return to a user interface 490 displayed before the call is received. For example, the previous user interface 490 may be a background screen (e.g., a watch screen) or an application execution screen.

Figure 5A:
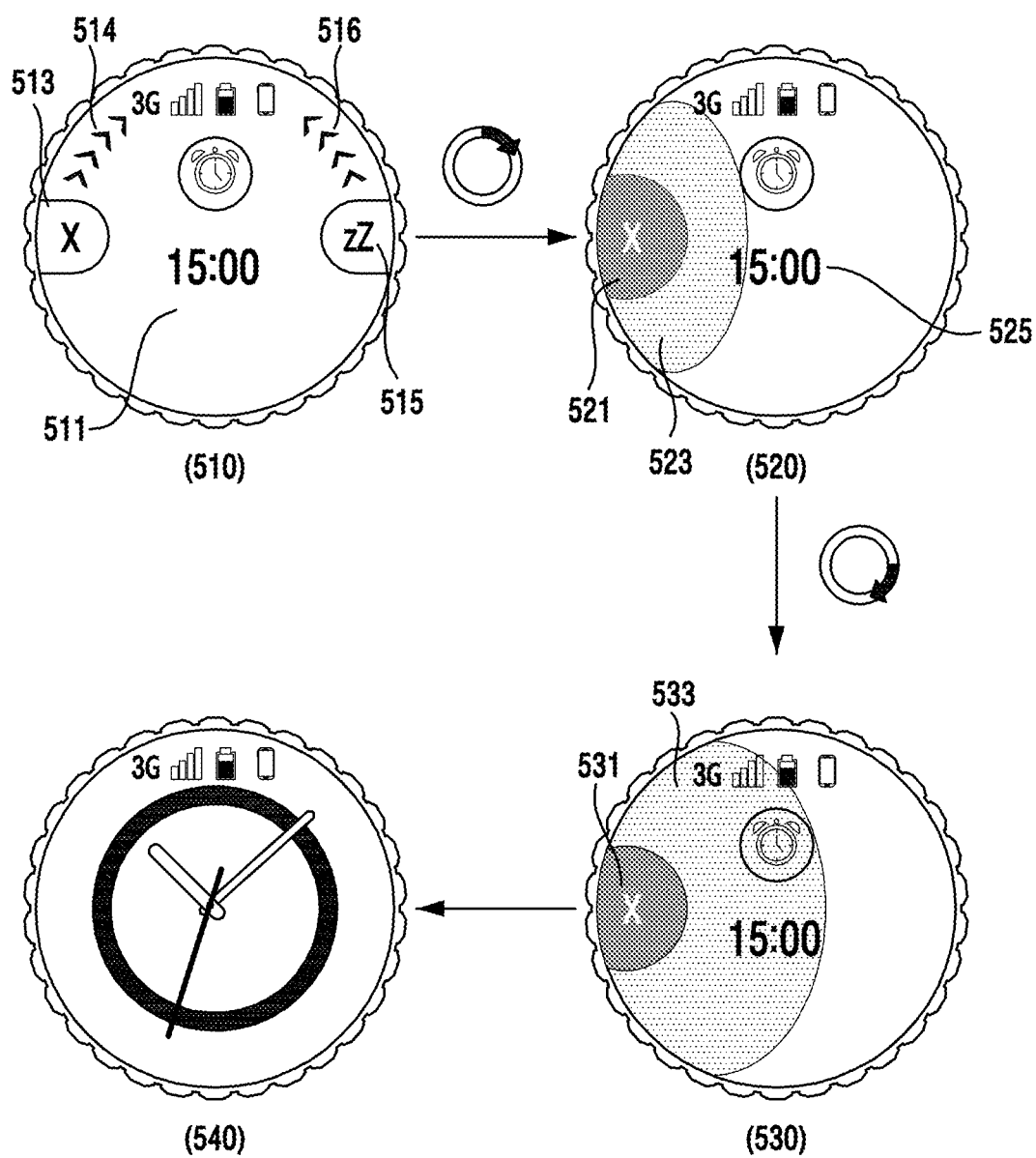
FIGS. 5A and 5B illustrate a method of providing a visual effect using a bezel-based interaction in an alarm application, according to an embodiment of the present disclosure.
Figure 5B:
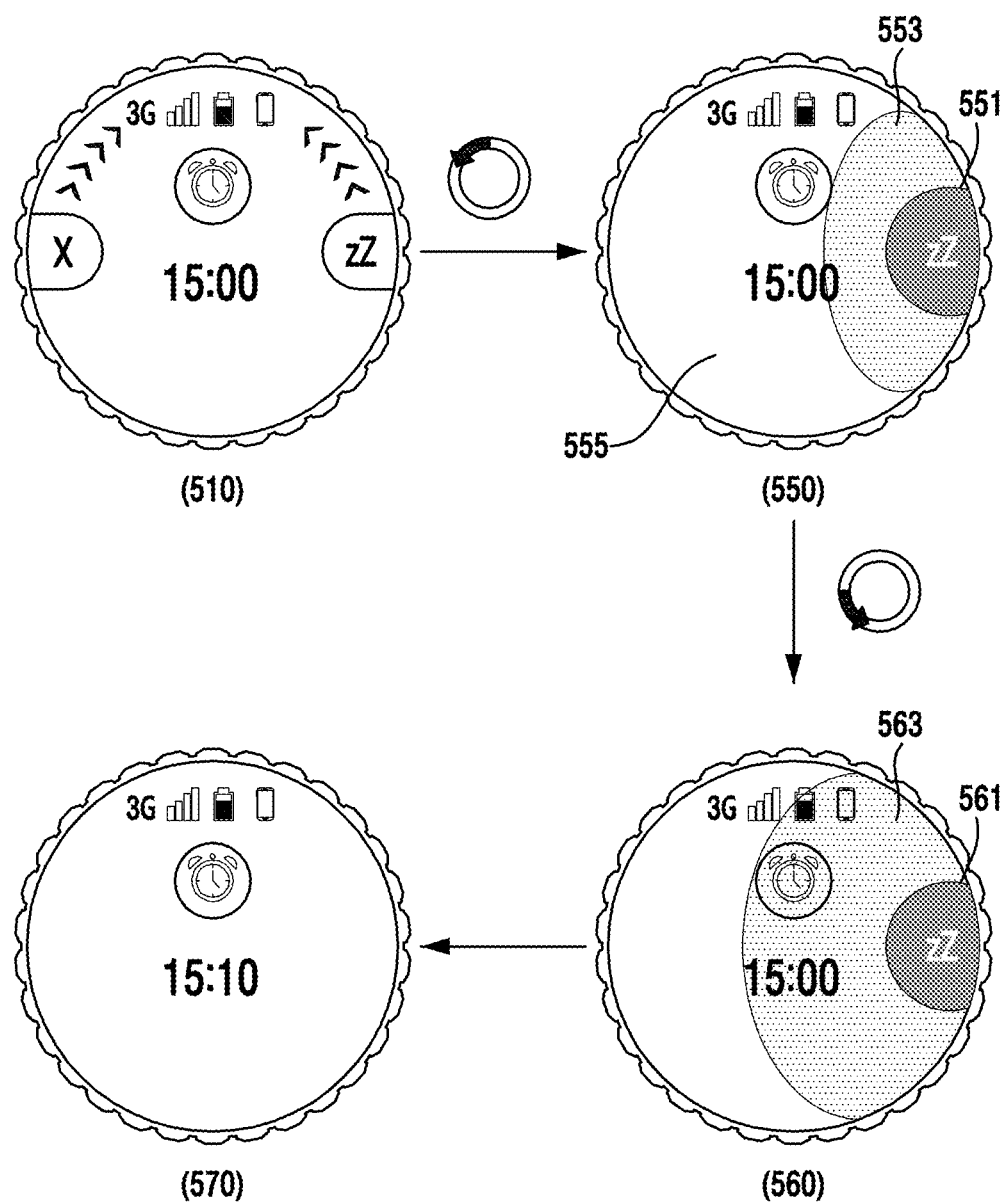

FIGS. 5A and 5B illustrate a method of providing a visual effect using a bezel-based interaction in an alarm application, according to an embodiment of the present disclosure.

Referring to FIG. 5A, a method of providing a visual effect associated with an alarm dismiss button (e.g., a first object) in an alarm application in the electronic device 100 is provided.

The controller 180 of the electronic device 100 may detect that an event occurs by an alarm when the current time is a previously set alarm time, and may provide a first user interface 510 associated with the detected event (e.g., an alarm). The first user interface 510 may include alarm information 511, an alarm dismiss button 513 (e.g., a first object), and a snooze button 515 (e.g., a second object). The alarm information 511 may include an alarm icon and an alarm time. Also, the first user interface 510 may include a cue 514 indicating the clockwise rotation of the rotating input module 22 to activate the alarm dismiss button 513. Also, the first user interface 510 may include a cue 516 indicating the counterclockwise rotation of the rotating input module 22 to activate the snooze button 515. While displaying the first user interface 510, the controller 180 may or may not output a sound or a vibration associated with an alarm.

When a bezel-based interaction (e.g., a rotation angle of 30 degrees), which corresponds to the clockwise rotation of the rotating input module 22 by a user, is detected, the controller 180 may provide a second user interface 520. The second user interface 520 may include an alarm dismiss button 521, a visual effect 523 associated with the alarm dismiss button 521, and alarm information 525. The controller 180 may remove the snooze button 515 when an input that rotates clockwise (e.g., a bezel-based interaction that desires to execute the alarm dismiss button 521) is detected. Alternatively, although an input that rotates clockwise is detected, the controller 180 may maintain the display of the snooze button 515, may display the snooze button 515 to be blurred by controlling the transparency, or may display the snooze button 515 in a smaller size by reducing the size of the snooze button 515.

The controller 180 may display the visual effect 523 to overlap a part or the entirety of the alarm information 525. Also, the controller 180 may display the visual effect 523 by varying at least one of the size, the shape, the transparency, and the color of the visual effect 523 according to a bezel-based interaction.

When a bezel-based interaction (e.g., a rotation angle of 60 degrees), which corresponds to the clockwise rotation of the rotating input module 22, is continuously detected while the second user interface 520 is displayed, the controller 180 may provide a third user interface 530. The third user interface 530 may include an alarm dismiss button 531, a visual effect 533 associated with the alarm dismiss button 531, and alarm information (e.g., an alarm icon and an alarm time). The controller 180 may increase the size of the visual effect 533 of the third user interface 530 to be larger than the visual effect 523 of the second user interface 520, decrease or increase the transparency, or change the color to be darker or brighter. In this instance, the controller 180 may determine whether the visual effect 533 exceeds a reference point.

When a bezel-based interaction (e.g., a rotation angle of 90 degrees), which corresponds to the clockwise rotation of the rotating input module 22, is continuously detected while the third user interface 530 is displayed, the controller 180 may provide a fourth user interface 540. When the visual effect 533 exceeds a reference point, the controller 180 may execute a function associated with the alarm dismiss button 531. For example, when the visual effect 533 exceeds a reference point, the controller 180 may dismiss the alarm. When the alarm is dismissed, the controller 180 may interrupt outputting a sound or a vibration associated with an alarm, remove a user interface (e.g., the first user interface 510) associated with an alarm, and return to a user interface 540 displayed before the alarm rings. For example, the previous user interface 540 may be a background screen (e.g., a watch screen) or an application execution screen.

Referring to FIG. 5B, a method of providing a visual effect associated with a snooze button (e.g., a second object) in an alarm application of the electronic device 100 is provided.

The controller 180 of the electronic device 100 may detect that an event occurs by an alarm when the current time is a previously set alarm time, and may provide the first user interface 510 associated with the detected event (e.g., an alarm). The first user interface 510 may include alarm information (e.g., an alarm icon and an alarm time), an alarm dismiss button (e.g., "X"), and a snooze button (e.g., "zZ"). The alarm information 511 may include an alarm icon and an alarm time. Also, the first user interface 510 may include a cue indicating the rotation direction of the rotating input module 22 for execution of the alarm dismiss button and a cue indicating the rotation direction of the rotating input module 22 for execution of the snooze button. While displaying the first user interface 510, the controller 180 may or may not output a sound or a vibration associated with an alarm.

When a bezel-based interaction (e.g., a rotation angle of −30 degrees), which corresponds to the counterclockwise rotation of the rotating input module 22 by a user, is detected, the controller 180 may provide a second user interface 550. The second user interface 550 may include a snooze button 551, a visual effect 553 associated with the snooze button 551, and alarm information 555. The controller 180 may remove the alarm dismiss button when an input that rotates counterclockwise (e.g., a bezel-based interaction that desires to execute the snooze button 551) is detected. Alternatively, although an input that rotates counterclockwise is detected, the controller 180 may maintain the display of the alarm dismiss button, may display the alarm dismiss button to be blurred by controlling the transparency of the alarm dismiss button, or may display the alarm dismiss button in a smaller size by reducing the size of the alarm dismiss button. The controller 180 may display the visual effect 553 to overlap a part or the entirety of the alarm information 555. Also, the controller 180 may display the visual effect 553 by varying at least one of the size, the shape, the transparency, and the color of the visual effect 423 according to a bezel-based interaction.

When a bezel-based interaction (e.g., a rotation angle of −60 degrees), which corresponds to the counterclockwise rotation of the rotating input module 22, is continuously detected while the second user interface 550 is displayed, the controller 180 may provide a third user interface 560. The third user interface 560 may include a snooze button 561, a visual effect 563 associated with the snooze button 561, and alarm information (e.g., an alarm icon and an alarm time). The controller 180 may increase the size of the visual effect 563 of the third user interface 560 to be larger than the visual effect 553 of the second user interface 550, decrease or increase the transparency, or change the color to be darker or brighter. In this instance, the controller 180 may determine whether the visual effect 563 exceeds a reference point.

When a bezel-based interaction (e.g., a rotation angle of −90 degrees), which corresponds to the counterclockwise rotation of the rotating input module 22, is continuously detected while the third user interface 530 is displayed, the controller 180 may provide a fourth user interface 570. When the visual effect 563 exceeds a reference point, the controller 180 may execute a function associated with the snooze button 561. For example, when the visual effect 563 exceeds a reference point, the controller 180 may reset an alarm. When the snooze button 561 is selected, the alarm is set to ring again after a predetermined period of time (e.g., 5 minutes or 10 minutes). When the alarm is reset, the controller 180 may interrupt outputting a sound or a vibration associated with an alarm, remove a user interface (e.g., the first user interface 510) associated with an alarm, and display a user interface 570 associated with the reset alarm. For example, the user interface 570 associated with the alarm may include an alarm image and a reset alarm time (e.g., "15:10").

Figure 6A:
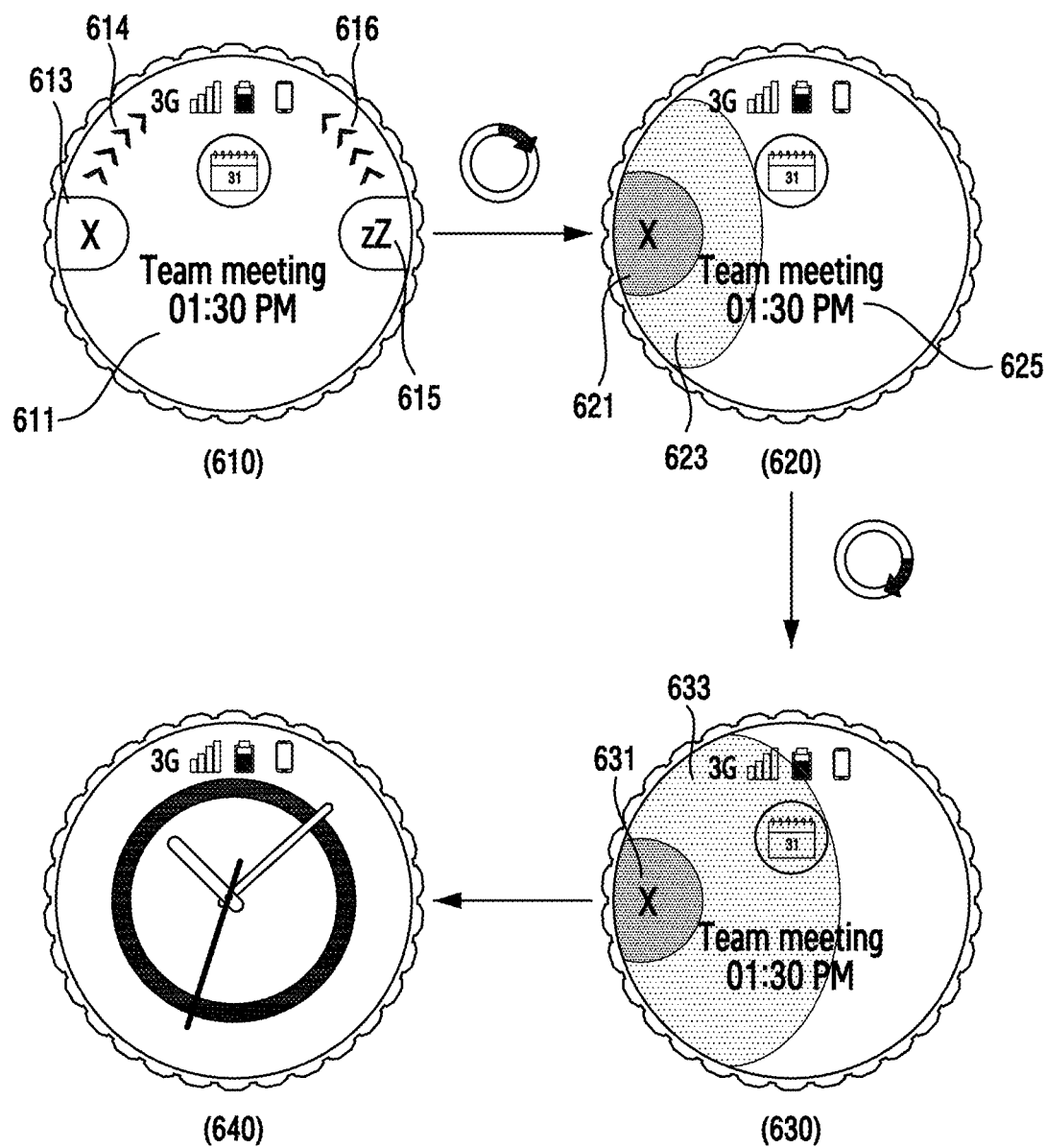
FIGS. 6A and 6B illustrate a method of providing a visual effect using a bezel-based interaction in a calendar application, according to an embodiment of the present disclosure.
Figure 6B:
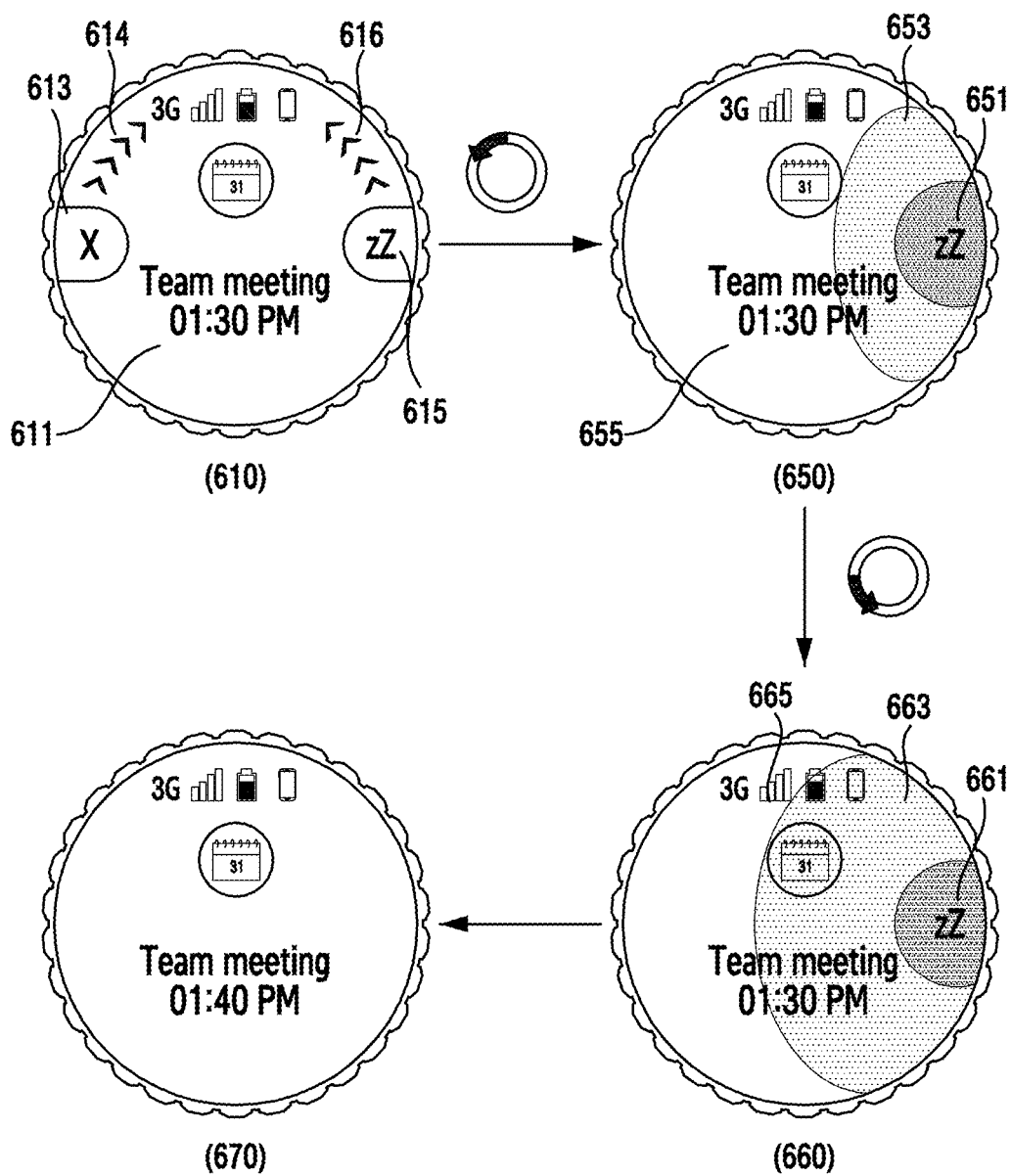

FIGS. 6A and 6B illustrate a method of providing a visual effect using a bezel-based interaction in a calendar application, according to an embodiment of the present disclosure.

Referring to FIG. 6A, a method of providing a visual effect associated with an alarm dismiss button (e.g., a first object) in a calendar application of the electronic device 100 is provided.

The controller 180 of the electronic device 100 may detect that an event occurs by a calendar alarm when the current date is a date set in a calendar (e.g., at 1:30 PM on Mar. 1, 2016), and may provide a first user interface 610 associated with the detected event (e.g., a calendar alarm). The first user interface 610 may include calendar information 611, an alarm dismiss button 613 (e.g., a first object), and a snooze button 615 (e.g., a second object). The calendar information 611 may include an icon associated with a set calendar (e.g., a calendar icon), a name (e.g., "Team meeting"), and a set date or time (e.g., "01:30 PM"). Also, the first user interface 610 may include a cue 614 indicating the clockwise rotation of the rotating input module 22) to activate the alarm dismiss button 613. Also, the first user interface 610 may include a cue 616 indicating the counterclockwise rotation of the rotating input module 22 to activate the snooze button 615. While displaying the first user interface 610, the controller 180 may or may not output a sound or a vibration associated with a calendar alarm.

When a bezel-based interaction (e.g., a rotation angle of 30 degrees), which corresponds to the clockwise rotation of the rotating input module 22 by a user, is detected, the controller 180 may provide a second user interface 620. The second user interface 620 may include an alarm dismiss button 621, a visual effect 623 associated with the alarm dismiss button 621, and calendar information 625. The controller 180 may remove the snooze button 615 when an input that rotates clockwise (e.g., a bezel-based interaction for executing the alarm dismiss button 621) is detected. Alternatively, although an input that rotates clockwise is detected, the controller 180 may maintain the display of the snooze button 615, may display the snooze button 615 to be blurred by controlling the transparency of the snooze button 615, or may display the snooze button 615 in a smaller size by reducing the size of the snooze button 615. The controller 180 may display the visual effect 623 to overlap a part or the entirety of the calendar information 625. Also, the controller 180 may display the visual effect 623 by varying at least one of the size, the shape, the transparency, and the color of the visual effect 623 according to a bezel-based interaction.

When a bezel-based interaction (e.g., a rotation angle of 60 degrees), which corresponds to the clockwise rotation of the rotating input module 22, is continuously detected while the second user interface 620 is displayed, the controller 180 may provide a third user interface 630. The third user interface 630 may include an alarm dismiss button 631, a visual effect 633 associated with the alarm dismiss button 631, and calendar information (e.g., a calendar icon and a time set in a calendar). The controller 180 may increase the size of the visual effect 633 of the third user interface 630 to be larger than the visual effect 623 of the second user interface 620, decrease or increase the transparency, and change the color to be darker or brighter. In this instance, the controller 180 may determine whether the visual effect 633 exceeds a reference point.

When a bezel-based interaction (e.g., a rotation angle of 90 degrees), which corresponds to the clockwise rotation of the rotating input module 22, is continuously detected while the third user interface 630 is displayed, the controller 180 may provide a fourth user interface 640. When the visual effect 633 exceeds a reference point, the controller 180 may execute a function associated with the alarm dismiss button 631. For example, when the visual effect 633 exceeds the reference point, the controller 180 may dismiss the calendar alarm. When the calendar alarm is dismissed, the controller 180 may interrupt outputting a sound or a vibration associated with an alarm, remove a user interface (e.g., the first user interface 610) associated with the calendar alarm, and return to a user interface 640 displayed before the calendar alarm rings. For example, the previous user interface 640 may be a background screen (e.g., a watch screen) or an application execution screen.

Referring to FIG. 6B a method of providing a visual effect associated with a snooze button (e.g., a second object) in a calendar application of the electronic device 100 is provided.

The controller 180 of the electronic device 100 may detect that an event occurs by a calendar alarm when the current date is a date set in a calendar, and may provide the first user interface 610 associated with the detected event (e.g., a calendar alarm). The first user interface 610 may include the calendar information 611, the alarm dismiss button 613, and the snooze button 615. Also, the first user interface 610 may include the cue 614 indicating the rotation direction of the rotating input module 22 for execution of the alarm dismiss button 613 and the cue 616 indicating the rotation direction of the rotating input module 22 for execution of the snooze button 615. While displaying the first user interface 610, the controller 180 may or may not output a sound or a vibration associated with an alarm.

When a bezel-based interaction (e.g., a rotation angle of −30 degrees), which corresponds to the counterclockwise rotation of the rotating input module 22 by a user, is detected while the first user interface 610 is displayed, the controller 180 may provide a second user interface 650. The second user interface 650 may include a snooze button 651, a visual effect 653 associated with the snooze button 651, and calendar information 655. The controller 180 may remove the alarm dismiss button when an input that rotates counterclockwise (e.g., a bezel-based interaction for executing the snooze button 651) is detected. Alternatively, although an input that rotates counterclockwise is detected, the controller 180 may maintain the display of the alarm dismiss button, may display the alarm dismiss button to be blurred by controlling the transparency of the alarm dismiss button, or may display the alarm dismiss button in a smaller size by reducing the size of the alarm dismiss button. The controller 180 may display the visual effect 653 to overlap a part or the entirety of the calendar information 655. Also, the controller 180 may display the visual effect 653 by varying at least one of the size, the shape, the transparency, and the color of the visual effect 653 according to a bezel-based interaction.

When a bezel-based interaction (e.g., a rotation angle of −60 degrees), which corresponds to the counterclockwise rotation of the rotating input module 22, is continuously detected while the second user interface 650 is displayed, the controller 180 may provide a third user interface 660. The third user interface 660 may include a snooze button 661, a visual effect 663 associated with the snooze button 661, and calendar information 665. The controller 180 may increase the size of the visual effect 663 of the third user interface 660 to be larger than the visual effect 653 of the second user interface 650, decrease or increase the transparency, or change the color to be darker or brighter. In this instance, the controller 180 may determine whether the visual effect 663 exceeds a reference point.

When a bezel-based interaction (e.g., a rotation angle of −90 degrees), which corresponds to the counterclockwise rotation of the rotating input module 22, is continuously detected while the third user interface 660 is displayed, the controller 180 may provide a fourth user interface 670. When the visual effect 663 exceeds a reference point, the controller 180 may execute a function associated with the snooze button 661. For example, when the visual effect 663 exceeds a reference point, the controller 180 may reset an alarm. When the snooze button 661 is selected, the alarm is set to ring again after a predetermined period of time (e.g., 5 minutes or 10 minutes). When the alarm is reset, the controller 180 may interrupt outputting a sound or a vibration associated with an alarm, remove a user interface associated with an alarm (e.g., the first user interface 610), and display a user interface 670 associated with the reset alarm. For example, the user interface 670 associated with the alarm may include a calendar image, a calendar name (e.g., "Team meeting"), and a reset alarm time (e.g., "01:40 PM").

Figure 7A:
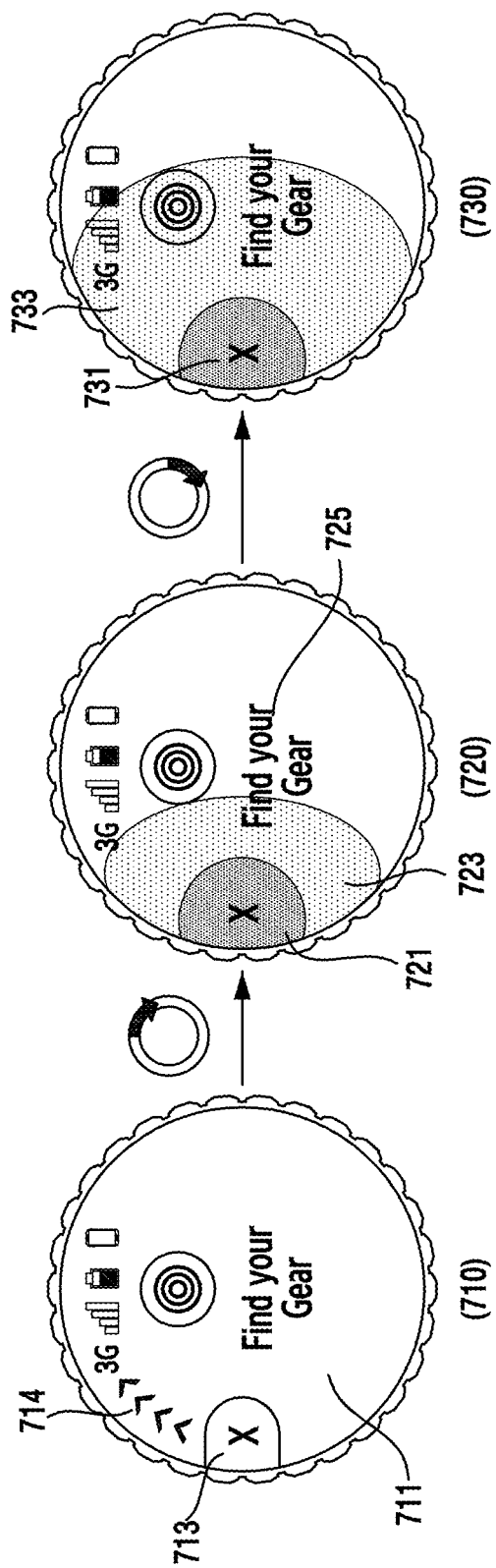
FIGS. 7A and 7B illustrate a method of providing a visual effect in a device search application, according to an embodiment of the present disclosure.
Figure 7B:
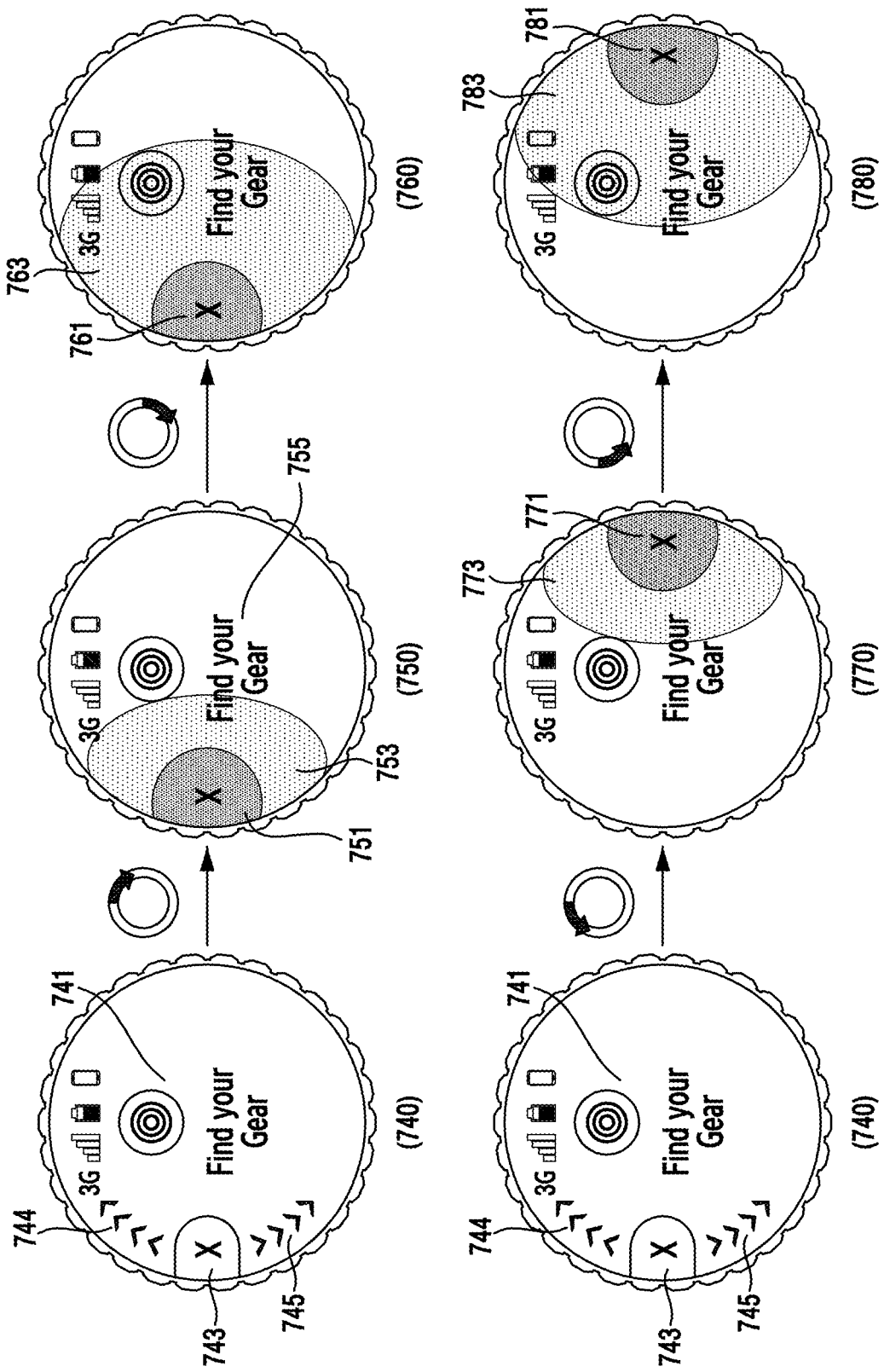

FIGS. 7A and 7B illustrate a method of providing a visual effect in a device search application, according to an embodiment of the present disclosure.

Referring to FIG. 7A, a method of providing a visual effect associated with a device off button (e.g., an object) in a device search application of the electronic device 100 is provided.

The controller 180 of the electronic device 100 may execute a device search application for searching for a device (e.g., the electronic device 100 or another device connected with the electronic device 100) by a user, and may receive a device search request (e.g., selecting a device search button) in the device search application. When the device search request is received, the controller 180 may detect that an event occurs, and may provide a first user interface 710 associated with the detected event (e.g., device search). The first user interface 710 may include device search information 711, a search off button 713 (e.g., an object), and a cue 714 indicating the rotation direction of the rotating input module 22 for activation of the search off button 713. The device search information 711 may include at least one of a device search image (e.g., an icon), a guidance message (e.g., "Find your Gear"), and a device name. While displaying the first user interface 710, the controller 180 may or may not output a sound or a vibration associated with the device search.

The first user interface 710 may include a search restart button in a location that faces the search off button 713, and may further include a cue indicating the rotation direction of the rotating input module 22 for activation of the search restart button. In this instance, the search off button 713 is a first object and the search restart button is a second object. The controller 180 may variably display a visual effect associated with the search restart button based on a bezel-based interaction that activates the search restart button, and may execute a function associated with the search restart button when the visual effect exceeds a reference point. When the device search is restarted, the controller 180 may perform a process for searching for a device. Alternatively, the first user interface 710 may include a search restart button instead of the search off button 713.

When a bezel-based interaction (e.g., a rotation angle of 30 degrees), which corresponds to the clockwise rotation of the rotating input module 22 by a user, is detected, the controller 180 may provide a second user interface 720. The second user interface 720 may include a search off button 721, a visual effect 723 associated with the search off button 721, and device search information 725. The controller 180 may display the visual effect 723 to overlap a part or the entirety of the device search information 725. Also, the controller 180 may display the visual effect 723 by varying at least one of the size, the shape, the transparency, and the color of the visual effect 723 according to a bezel-based interaction. In this instance, the controller 180 may determine whether the visual effect 723 exceeds a reference point.

When a bezel-based interaction (e.g., a rotation angle of 60 degrees), which corresponds to the clockwise rotation of the rotating input module 22, is continuously detected while the second user interface 720 is displayed, the controller 180 may provide a third user interface 730. As shown in the third user interface 730, the controller 180 may execute a function associated with the device off button 731 when the visual effect 733 exceeds a reference point. For example, when the visual effect 733 exceeds a reference point, the controller 180 may stop searching for a device. When the device search is interrupted, the controller 180 may remove a user interface (e.g., the first user interface 710) associated with device search, and may return to a user interface displayed before the device search is executed. For example, the previous user interface may be an initial screen (or main screen) of the device search application.

Referring to FIG. 7B, a method of providing a visual effect associated with a device off button (e.g., an object) in a device search application of the electronic device 100 is provided.

The controller 180 of the electronic device 100 executes a device search application by a user, and receives a device search request in the device search application, the controller 180 may provide a first user interface 740 associated with an event (e.g., device search). The first user interface 740 may include device search information 741, a search off button 743, and a first cue 744 and a second cue 745 indicating the rotation direction of the rotating input module 22 for activation of the search off button 743. The first cue 744 is a guidance signal indicating a clockwise rotation direction. The second cue 745 is a guidance signal indicating a counterclockwise rotation direction.

When a bezel-based interaction (e.g., a rotation angle of 30 degrees), which corresponds to the clockwise rotation of the rotating input module 22 by a user, is detected while the first user interface 740 is displayed, the controller 180 may provide a second user interface 750. The second user interface 750 may include a search off button 751, a visual effect 753 associated with the search off button 751, and device search information 755. The second user interface 750 is the same as or similar to the second user interface 720, and thus, a detailed description of the user interface 750 will be omitted.

When a bezel-based interaction (e.g., a rotation angle of 60 degrees), which corresponds to the clockwise rotation of the rotating input module 22, is continuously detected while the second user interface 750 is displayed, the controller 180 may provide a third user interface 760. As shown in the third user interface 760, the controller 180 may execute a function associated with the device off button 761 when the visual effect 763 exceeds a reference point. For example, the controller 180 may stop searching for a device, remove a user interface (e.g., the first user interface 740) associated with device search, and may return to a user interface displayed before the device search is executed.

When a bezel-based interaction (e.g., a rotation angle of −30 degrees), which corresponds to the counterclockwise rotation of the rotating input module 22 by a user (e.g., the second cue 745), is detected while the first user interface 740 is displayed, the controller 180 may provide a second user interface 770. The second user interface 770 may include a search off button 771, a visual effect 773 associated with the search off button 771, and device search information (e.g., a search icon (e.g., "Find your Gear")). When an input corresponding to a counterclockwise rotation (e.g., the second cue 745) is detected, the controller 180 may move the search off button 771 to a location opposite the original search off button 743. That is, when the original search off button 743 of the first user interface 740 is disposed at the 9 o'clock location (e.g., on the left) of the watch, the search off button 771 of the second user interface 770 may be disposed at the 3 o'clock location (e.g., on the right). The controller 180 may control the size of the visual effect 773 associated with the search off button 771 to be increased from the right to the left as the location of the search off button 771 changes. Alternatively, the controller 180 may not change the location of the search off button 771, and may only change the location of the visual effect 773 associated with the search off button 771.

When a bezel-based interaction (e.g., a rotation angle of −60 degrees), which corresponds to the counterclockwise rotation of the rotating input module 22, is continuously detected while the second user interface 770 is displayed, the controller 180 may provide a third user interface 780. As shown in the third user interface 780, the controller 180 may execute a function associated with the device off button 781 when the visual effect 783 exceeds a reference point. For example, when the visual effect 783 exceeds the reference point, the controller 180 may stop searching for a device. When the device search is interrupted, the controller 180 may remove a user interface (e.g., the first user interface 740) associated with the device search, and may return to a user interface displayed before the device search is executed.

Figure 8A:
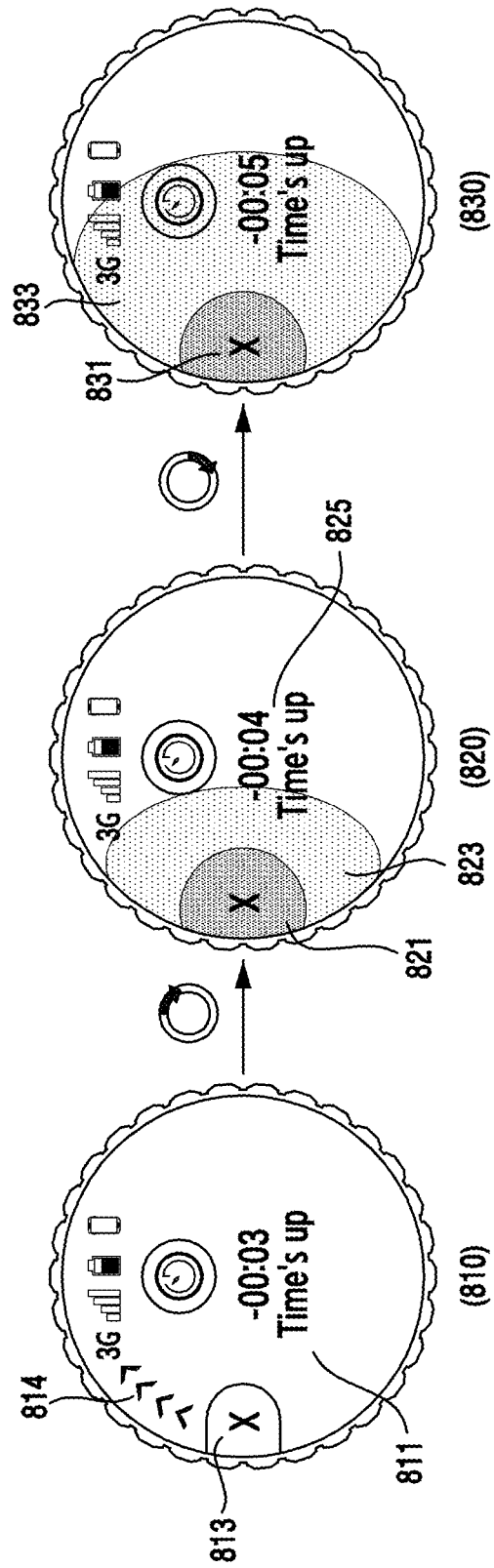
FIGS. 8A and 8B illustrate a method of providing a visual effect using a bezel-based interaction in a timer application, according to an embodiment of the present disclosure.
Figure 8B:
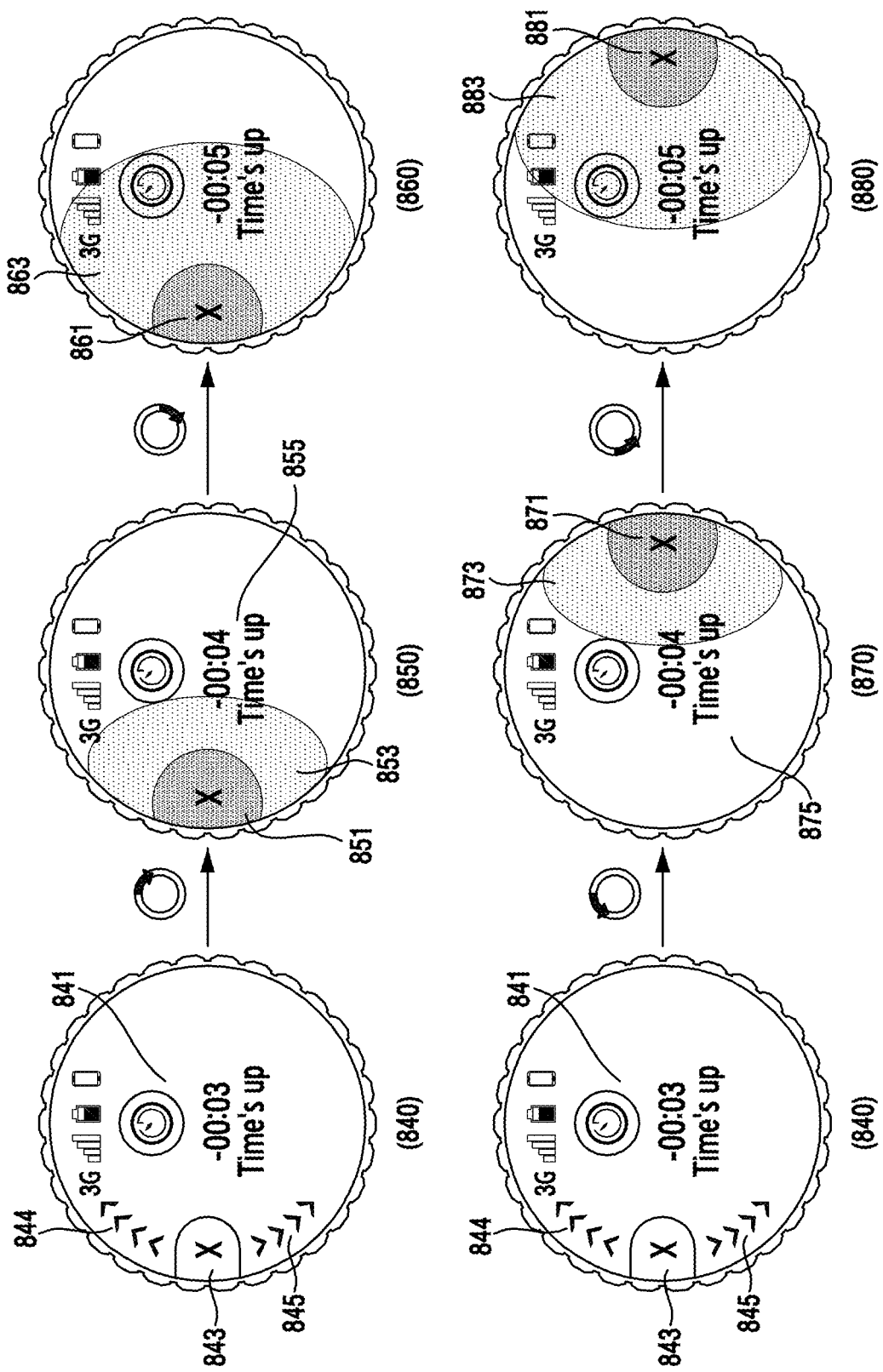

FIGS. 8A and 8B illustrate a method of providing a visual effect using a bezel-based interaction in a timer application, according to an embodiment of the present disclosure.

Referring to FIG. 8A a method of providing a visual effect associated with a timer off button (e.g., an object) in a timer application of the electronic device 100 is provided.

The controller 180 of the electronic device 100 may execute a timer application by a user, and may receive a timer start request (e.g., selecting a start) in the timer application. When the timer start request is received, the controller 180 may detect that an event occurs, and may provide a first user interface 810 associated with the detected event (e.g., a timer). The first user interface 810 may include timer information 811, a timer off button 813 (e.g., an object), and a cue 814 indicating the rotation direction of the rotating input module 22 for activation of the timer off button 813. The timer information 811 may include at least one of a timer image (e.g., a timer icon), a timer time (e.g., "−00:03"), and a timer guidance message (e.g., "Time's up"). While displaying the first user interface 810, the electronic device 100 (e.g., the controller 180) may or may not output a sound or a vibration associated with a timer.

The first user interface 810 may include a timer restart button in a location that faces the timer off button 813, and may further include a cue indicating the rotation direction of the rotating input module 22 for activation of the timer restart button. In this instance, the timer off button 813 is a first object and the timer restart button is a second object. The controller 180 may variably display a visual effect associated with the timer restart button based on a bezel-based interaction that activates the timer restart button, and may execute a function associated with the timer restart button when the visual effect exceeds a reference point. When the timer is restarted, the controller 180 may remove a currently counted time, and may restart the timer from 0 seconds. Alternatively, the first user interface 810 may include a timer restart button instead of the timer off button 813.

When a bezel-based interaction (e.g., a rotation angle of 30 degrees), which corresponds to the clockwise rotation of the rotating input module 22 by a user, is detected, the controller 180 may provide a second user interface 820. The second user interface 820 may include a timer off button 821, a visual effect 823 associated with the timer off button 821, and timer information 825. The controller 180 may display the visual effect 823 to overlap a part or the entirety of the timer information 825. Also, the controller 180 may display the visual effect 823 by varying at least one of the size, the shape, the transparency, and the color of the visual effect 823 according to a bezel-based interaction. In this instance, the controller 180 may determine whether the visual effect 823 exceeds a reference point.

When a bezel-based interaction (e.g., a rotation angle of 60 degrees), which corresponds to the clockwise rotation of the rotating input module 22, is continuously detected while the second user interface 820 is displayed, the controller 180 may provide a third user interface 830. As shown in the third user interface 830, the controller 180 may execute a function associated with the timer off button 831 when a visual effect 833 exceeds a reference point. For example, when the visual effect 833 exceeds the reference point, the controller 180 may stop a timer. When the timer is interrupted, the controller 180 may remove a currently counted time, and may return to a user interface displayed before the timer starts. For example, the previous user interface may be an initial screen (or main screen) of the timer application.

Referring to FIG. 8B, another method of providing a visual effect associated with a timer off button (e.g., an object) in a timer application of the electronic device 100 is provided.

When the controller 180 of the electronic device 100 executes a timer application by a user, and receives a timer start request in the timer application, the controller 180 may provide a first user interface 840 associated with an event (e.g., starting a timer). The first user interface 840 may include timer information 841, a timer off button 843, and a first cue 844 and a second cue 845 indicating the rotation direction of the rotating input module 22 for activation of the timer off button 843. The first cue 844 is a guidance signal indicating a clockwise rotation direction. The second cue 845 is a guidance signal indicating a counterclockwise rotation direction.

When a bezel-based interaction (e.g., a rotation angle of 30 degrees), which corresponds to the clockwise rotation (e.g., the first cue 844) of the rotating input module 22 by a user, is detected while the first user interface 840 is displayed, the controller 180 may provide a second user interface 850. The second user interface 850 may include a timer off button 851, a visual effect 853 associated with the timer off button 851, and timer information 855. The second user interface 850 is the same as or similar to the second user interface 820, and thus, a detailed description of the second user interface 850 will be omitted.

When a bezel-based interaction (e.g., a rotation angle of 60 degrees), which corresponds to the clockwise rotation of the rotating input module 22, is continuously detected while the second user interface 850 is displayed, the controller 180 may provide a third user interface 860. As shown in the third user interface 860, the controller 180 may execute a function associated with the device off button 861 when the visual effect 863 exceeds a reference point. For example, the controller 180 may remove a currently counted time, and may return to a user interface displayed before the timer starts.

When a bezel-based interaction (e.g., a rotation angle of −30 degrees), which corresponds to the counterclockwise rotation of the rotating input module 22 by a user (e.g., the second cue 845), is detected while the first user interface 840 is displayed, the controller 180 may provide a second user interface 870. The second user interface 870 may include a timer off button 871, a visual effect 873 associated with the timer off button 871, and timer information 875 (e.g., "−00:04" or "Time's up"). When an input that corresponds to a counterclockwise rotation is detected, the controller 180 may move the timer off button 871 to a location opposite the original timer off button 843. That is, when the original timer off button 843 of the first user interface 840 is disposed at the 9 o'clock location (e.g., on the left) of the watch, the timer off button 871 of the second user interface 870 may be disposed at the 3 o'clock location (e.g., on the right). The controller 180 may control the size of the visual effect 873 associated with the timer off button 871 to be increased from the right to the left as the location of the timer off button 871 changes. Alternatively, the controller 180 may not change the location of the timer off button 871, and may only change the location of the visual effect 873 associated with the timer off button 871.

When a bezel-based interaction (e.g., a rotation angle of −60 degrees), which corresponds to the counterclockwise rotation of the rotating input module 22, is continuously detected while the second user interface 870 is displayed, the controller 180 may provide a third user interface 880. As shown in the third user interface 880, the controller 180 may execute a function associated with the timer off button 881 when the visual effect 883 exceeds a reference point. For example, the controller 180 may remove a currently counted time, and may return to a user interface displayed before the timer starts.

Figure 9:
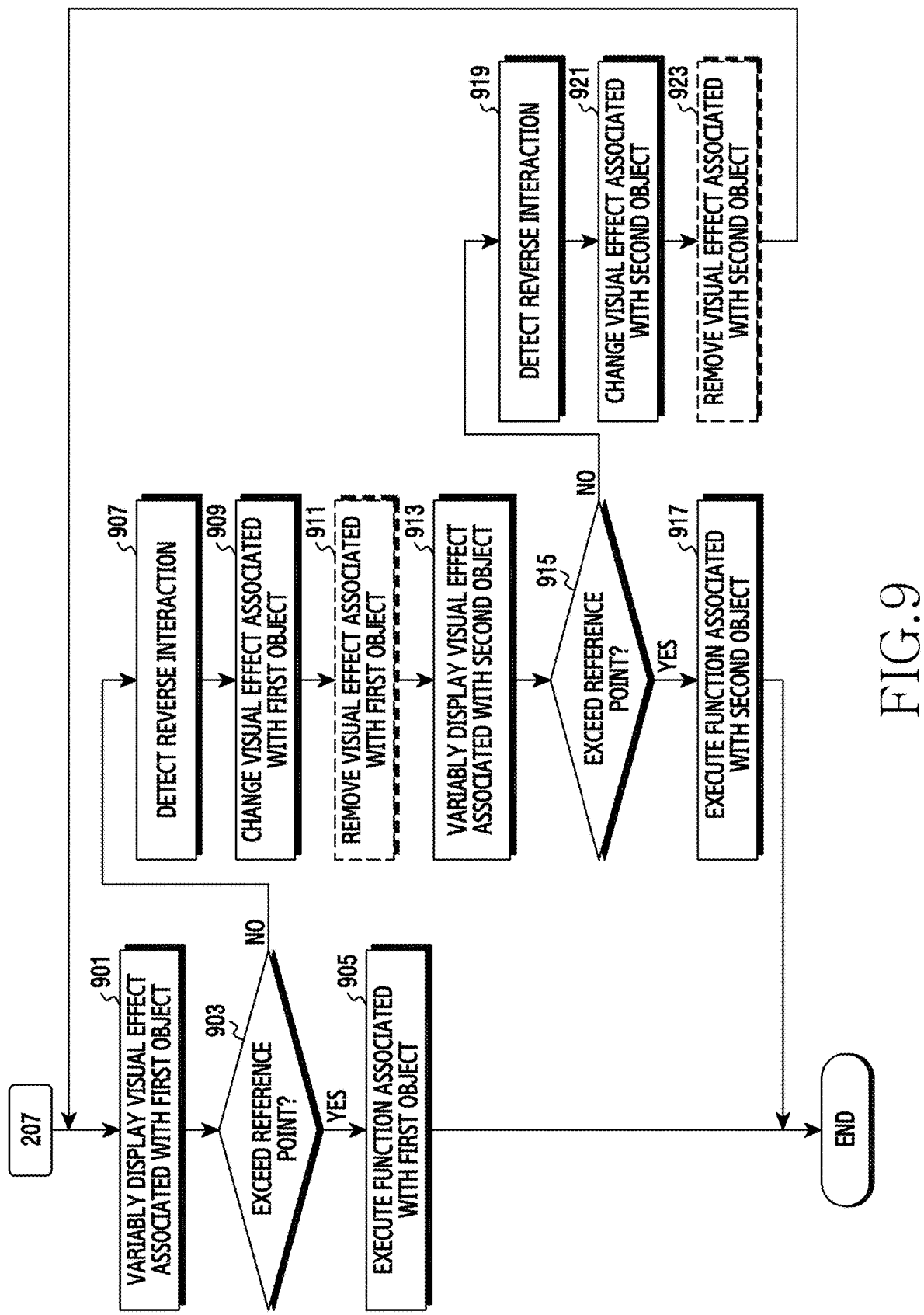
FIG. 9 is a flowchart of a method of providing a visual effect using a bezel-based interaction in an electronic device, according to an embodiment of the present disclosure.

FIG. 9 is a flowchart of a method of providing a visual effect using a bezel-based interaction in an electronic device, according to an embodiment of the present disclosure.

Referring to FIG. 9, at step 901, the controller 180 of the electronic device 100 variably displays a visual effect associated with a first object. Step 901 may be performed after step 207 of FIG. 2. When two objects are displayed at step 203, an object of which a visual effect is to be provided may be determined by steps 205 and 207 of FIG. 2. Step 901 is the same as or similar to step 209 of FIG. 2. Hereinafter, descriptions will be provided from the perspective of an example in which the object determined at step 901 is a first object (e.g., call connection) executed by a clockwise rotation.

At step 903, the controller 180 may determine whether the displayed visual effect exceeds a reference point (or a reference line). Step 903 is the same as or similar to step 211 of FIG. 2.

When the visual effect exceeds the reference point, the controller 180 performs step 905. When the visual effect does not exceed the reference point, the controller 180 performs step 907.

When the visual effect exceeds the reference point, the controller 180 executes a function associated with the first object at step 905. When the first object is a call connection button, the controller 180 may connect a call with a caller of an external electronic device. When the call is connected with the caller, the controller 180 may display a user interface associated with a call connection (e.g., the user interface 450 of FIG. 4A).

When the visual effect does not exceed the reference point, the controller 180 detects a reverse interaction at step 907. The reverse interaction indicates an input that is detected in the opposite direction of the interaction detected at step 901. As described above, an interaction that rotates clockwise is detected at step 901. In this instance, the reverse interaction indicates an input that rotates counterclockwise. Alternatively, when step 901 corresponds to an interaction that rotates counterclockwise, the reverse interaction is an input that rotates clockwise.

At step 909, the controller 180 may change a visual effect associated with the first object. For example, the controller 180 may display the visual effect associated with the first object in a small size, as the reverse interaction is detected. That is, the controller 180 may display the visual effect displayed at step 909 to be smaller than the visual effect displayed at step 901. Alternatively, the controller 180 may display the visual effect displayed at step 909 to have a lower or higher degree of transparency, and to have a brighter or darker color, than the visual effect displayed at step 901.

At step 911, the controller 180 may optionally remove a visual effect associated with the first object. The controller 180 may completely remove the visual effect associated with the first object, and may return to a screen state displayed at step 203 of FIG. 2. For example, the controller 180 may return to a screen state before the bezel-based interaction of step 205 of FIG. 2 is detected. When the reverse interaction is continuously detected, the controller 180 may perform step 913.

At step 913, the controller 180 may variably display a visual effect associated with a second object. The second object may be an object (e.g., call rejection) executed by a counterclockwise rotation. The controller 180 may variably display the visual effect associated with the second object after the visual effect associated with the first object is completely removed. Alternatively, the controller 180 may display the visual effect associated with the first object to be gradually smaller and may display the visual effect associated with the second object to be gradually larger, based on the reverse interaction. That is, the controller 180 may display the visual effect associated with the first object and the visual effect associated with the second object at the same time.

At step 915, the controller 180 may determine whether the displayed visual effect exceeds a reference point (or a reference line). Step 915 is the same as or similar to step 903, and a detailed description of step 915 will be omitted.

When the visual effect exceeds the reference point, the controller 180 performs step 917. When the visual effect does not exceed the reference point, the controller 180 performs step 919.

When the visual effect exceeds the reference point, the controller 180 executes a function associated with the second object at step 917. When the second object is a call rejection button, the controller 180 may interrupt outputting a sound or a vibration associated with a call notification, remove a user interface associated with a call (e.g., the first user interface 410), and return to a user interface 490 displayed before the call is received.

When the visual effect does not exceed the reference point, the controller 180 determines whether a reverse interaction is detected at step 919. The reverse interaction indicates an input that is detected in the opposite direction of the interaction detected at steps 907 to 913. As described above, an interaction that rotates counterclockwise is detected at steps 907 to 913. In this instance, the reverse interaction is an input that rotates clockwise.

At step 921, the controller 180 may change a visual effect associated with the second object. For example, the controller 180 may display the visual effect associated with the second object in a small size, as the reverse interaction is detected. That is, the controller 180 may display the visual effect displayed at step 919 to be smaller than the visual effect displayed at step 913. Alternatively, the controller 180 may display the visual effect displayed at step 919 to have a lower or higher degree of transparency, and to have a brighter or darker color, than the visual effect displayed at step 913.

At step 923, the controller 180 may optionally remove a visual effect associated with the second object. The controller 180 may completely remove the visual effect associated with the second object, and may return to a screen state displayed at step 203 of FIG. 2. For example, the controller 180 may return to a screen state displayed before the bezel-based interaction of step 205 of FIG. 2 is detected. When the reverse interaction is continuously detected, the controller 180 may perform step 901.

Figure 10:
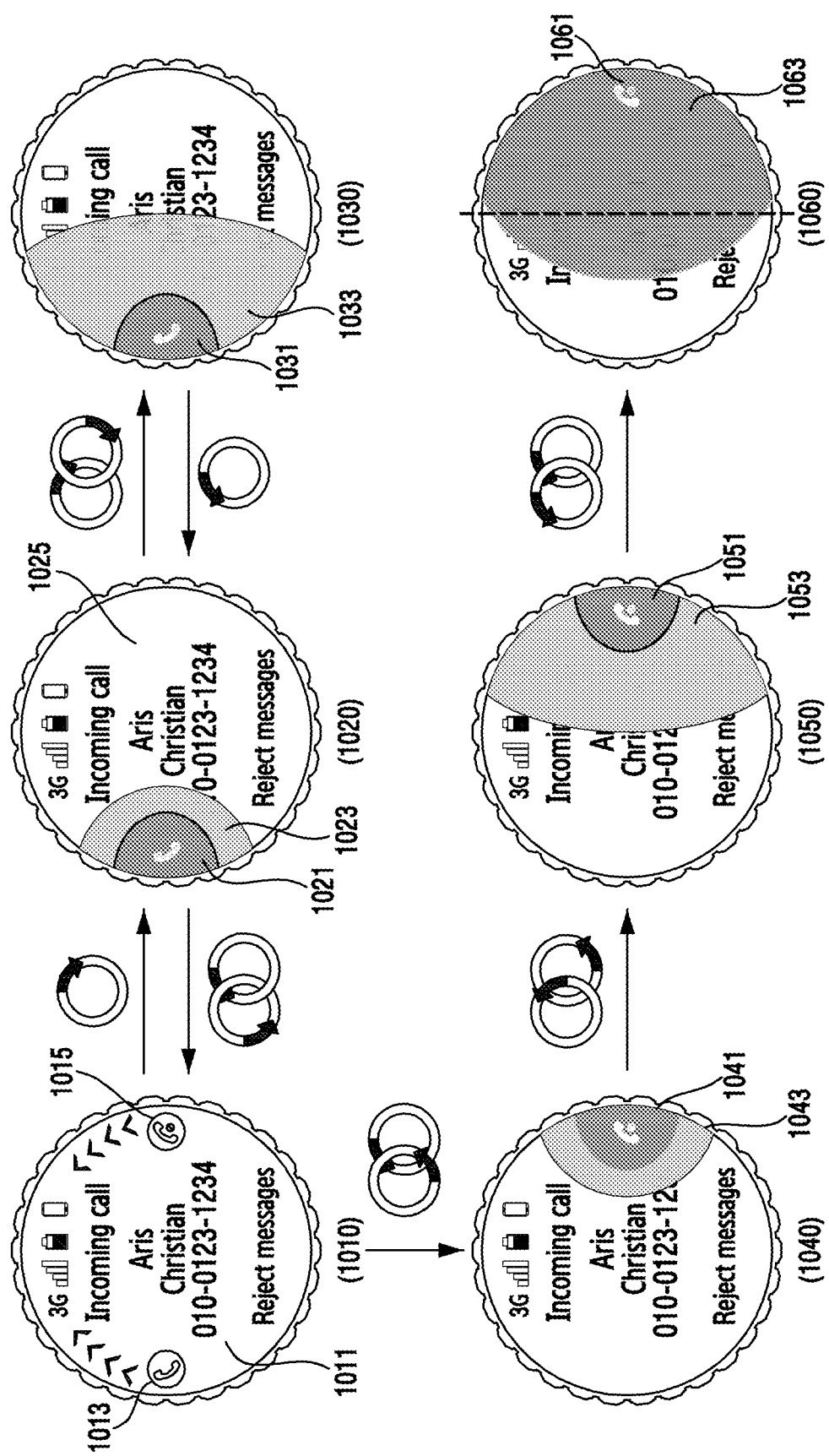
FIGS. 10 and 11 illustrate methods of providing a visual effect using a bezel-based interaction in a phone application, according to an embodiment of the present disclosure.
Figure 11:
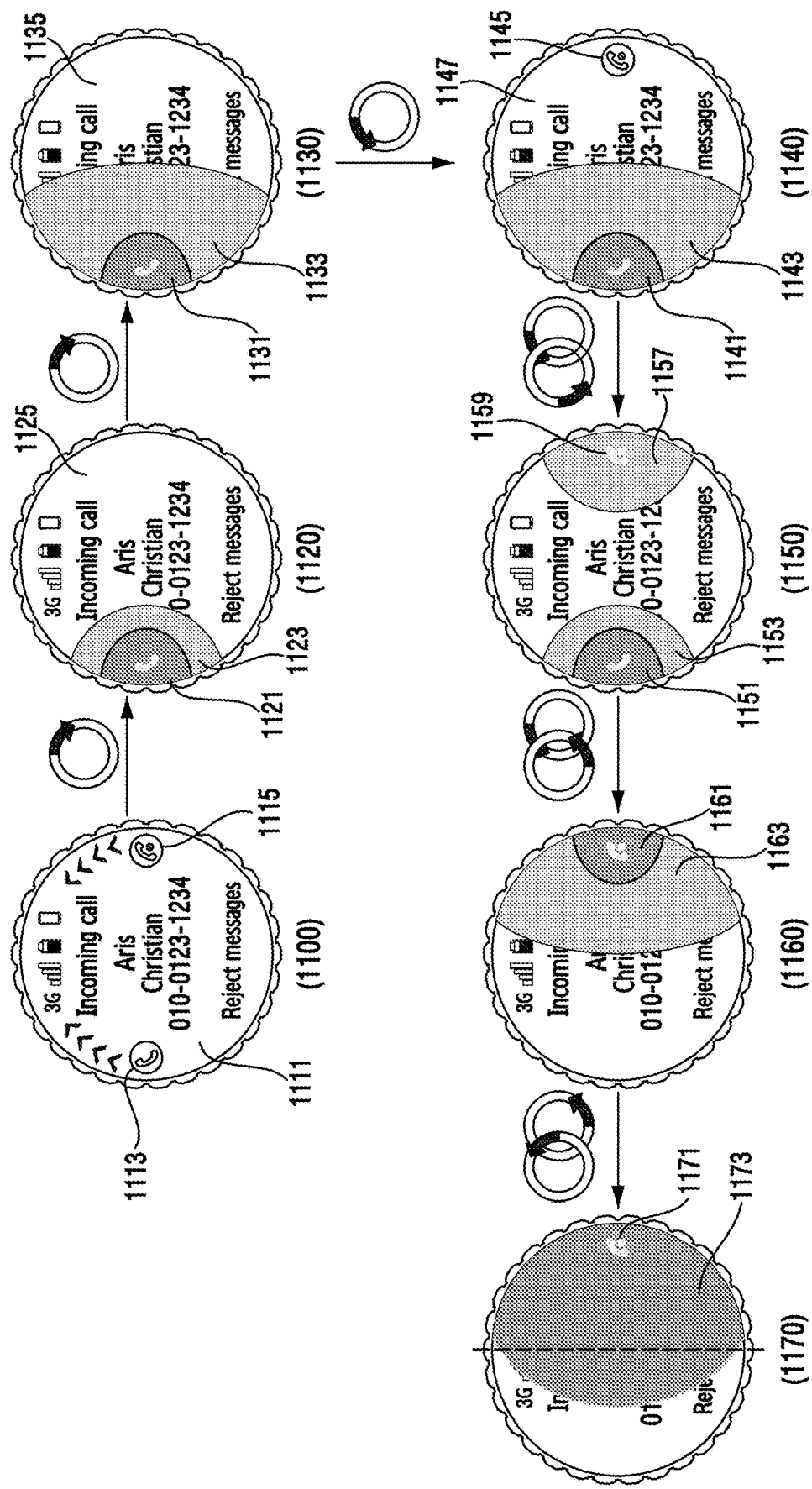

FIGS. 10 and 11 illustrate methods of providing a visual effect using a bezel-based interaction in a phone application, according to an embodiment of the present disclosure.

Referring to FIG. 10, another method of providing a visual effect in a phone application of the electronic device 100 is provided.

The controller 180 of the electronic device 100 may detect that an event occurs upon receiving a call from an external electronic device, and may provide a first user interface 1010 associated with the event that has occurred (e.g., a call). The first user interface 1010 may include call information 1011, a call connection button 1013, and a call rejection button 1015. The first user interface 1010 is the same as the first user interface 410 of FIG. 4A, and thus, a detailed description of the first user interface 1010 will be omitted.

When a clockwise bezel-based interaction (e.g., a rotation angle of 30 degrees) is detected while the first user interface 1010 is displayed, the controller 180 may provide a second user interface 1020. The second user interface 1020 may include a call connection button 1021, a visual effect 1023 associated with the call connection button 1021, and call information 1025.

When the clockwise bezel-based interaction (e.g., a rotation angle of 60 degrees) is continuously detected while the second user interface 1020 is displayed, the controller 180 may provide a third user interface 1030. The third user interface 1030 may include a call connection button 1031, a visual effect 1033 associated with the call connection button 1031, and call information (e.g., "Aris Christian" or "010-0123-1234").

When a counterclockwise bezel-based interaction (e.g., a reverse interaction) is detected while the third user interface 1030 is displayed, the controller 180 may provide the second user interface 1020.

When the counterclockwise bezel-based interaction is detected while the second user interface 1020 is displayed, the controller 180 may provide the first user interface 1010. That is, when the counterclockwise bezel-based interaction is continuously detected while the third user interface 1030 is displayed, the controller 180 may return to an initial screen (e.g., the first user interface 1010).

When a counterclockwise bezel-based interaction (e.g., a reverse interaction) is detected while the first user interface 1010 is displayed, the controller 180 may provide a fourth user interface 1040. The fourth user interface 1040 may include a call rejection button 1041, a visual effect 1043 associated with the call rejection button 1041, and call information (e.g., "Aris Christian" or "010-0123-1234"). The fourth user interface 1040 may be the same as or similar to the second user interface 460 of FIG. 4B.

When the counterclockwise bezel-based interaction is continuously detected while the fourth user interface 1040 is displayed, the controller 180 may provide a fifth user interface 1050. The fifth user interface 1050 may include a call rejection button 1051, a visual effect 1053 associated with the call rejection button 1051, and call information (e.g., "Aris Christian" or "010-0123-1234"). The fifth user interface 1050 may be the same as or similar to the third user interface 470 of FIG. 4B.

When the counterclockwise bezel-based interaction is continuously detected while the fifth user interface 1050 is displayed, the controller 180 may provide a sixth user interface 1060. The sixth user interface 1060 may include a call rejection button 1061 and a visual effect 1063 associated with the call rejection button 1061. The call information may not be seen by being covered with the visual effect 1063 in the sixth user interface 1060. As shown in the sixth user interface 1060, the controller 180 may execute a function associated with the call rejection button 1061 when a visual effect 1063 exceeds a reference point (or a reference line). For example, the controller 180 may interrupt outputting a sound or a vibration associated with a call notification, remove a user interface associated with a call (e.g., the first user interface 1010), and return to a user interface 490 of FIG. 4B displayed before the call is received. For example, the previous user interface may be a background screen (e.g., a watch screen) or an application execution screen.

Referring to FIG. 11 another method of providing a visual effect in a phone application of the electronic device 100 is provided.

The controller 180 of the electronic device 100 may detect that an event occurs upon receiving a call from an external electronic device, and may provide a first user interface 1100 associated with the event that has occurred (e.g., a call). The first user interface 1100 may include call information 1111, a call connection button 1113, and a call rejection button 1115. The first user interface 1100 is the same as the first user interface 1010 of FIG. 10, and thus, a detailed descriptions of the first user interface 1100 will be omitted.

When a clockwise bezel-based interaction (e.g., a rotation angle of 30 degrees) is detected while the first user interface 1100 is displayed, the controller 180 may provide a second user interface 1120. The second user interface 1120 may include a call connection button 1121, a visual effect 1123 associated with the call connection button 1121, and call information 1125.

When the clockwise bezel-based interaction (e.g., a rotation angle of 60 degrees) is continuously detected while the second user interface 1120 is displayed, the controller 180 may provide a third user interface 1130. The third user interface 1130 may include a call connection button 1131, a visual effect 1133 associated with the call connection button 1131, and call information 1135.

When a counterclockwise bezel-based interaction (e.g., a reverse interaction) is detected while the third user interface 1130 is displayed, the controller 180 may provide a fourth user interface 1140. The fourth user interface 1140 may include a call connection button 1141, a visual effect 1143 associated with the call connection button 1141, call information 1147, and a call rejection button 1145. That is, when the reverse interaction is detected, the controller 180 may display the call rejection button 1145 again, which has been removed.

When the counterclockwise bezel-based interaction is continuously detected while the fourth user interface 1140 is displayed, the controller 180 may provide a fifth user interface 1150. The fifth user interface 1150 may include a call connection button 1151, a visual effect 1153 associated with the call connection button 1151, call information (e.g., "Aris Christian" or "010-0123-1234"), a call rejection button 1159, and a visual effect 1157 associated with the call rejection button 1159. That is, the controller 180 may display both the visual effect 1153 associated with the call connection button 1151 and the visual effect 1157 associated with the call rejection button 1159 at the same time, as the reverse interaction is detected.

When the counterclockwise bezel-based interaction is continuously detected while the fifth user interface 1150 is displayed, the controller 180 may provide a sixth user interface 1160. The sixth user interface 1160 may include a call rejection button 1161, a visual effect 1163 associated with the call rejection button 1161, and call information (e.g., "Aris Christian" or "010-0123-1234"). The sixth user interface 1160 may be the same as or similar to the third user interface 470 of FIG. 4B.

When the counterclockwise bezel-based interaction is continuously detected while the sixth user interface 1060 is displayed, the controller 180 may provide a seventh user interface 1170. The seventh user interface 1170 may include a call rejection button 1171 and a visual effect 1173 associated with the call rejection button 1171. The call information may not be seen by being covered with the visual effect 1173 in the seventh user interface 1170. As shown in the seventh user interface 1170, the controller 180 may execute a function associated with the call rejection button 1171 when the visual effect 1173 exceeds a reference point (or a reference line). For example, the controller 180 may interrupt outputting a sound or a vibration associated with a call notification, remove a user interface associated with a call (e.g., the first user interface 1100), and return to a user interface displayed before the call is received.

Figure 12:
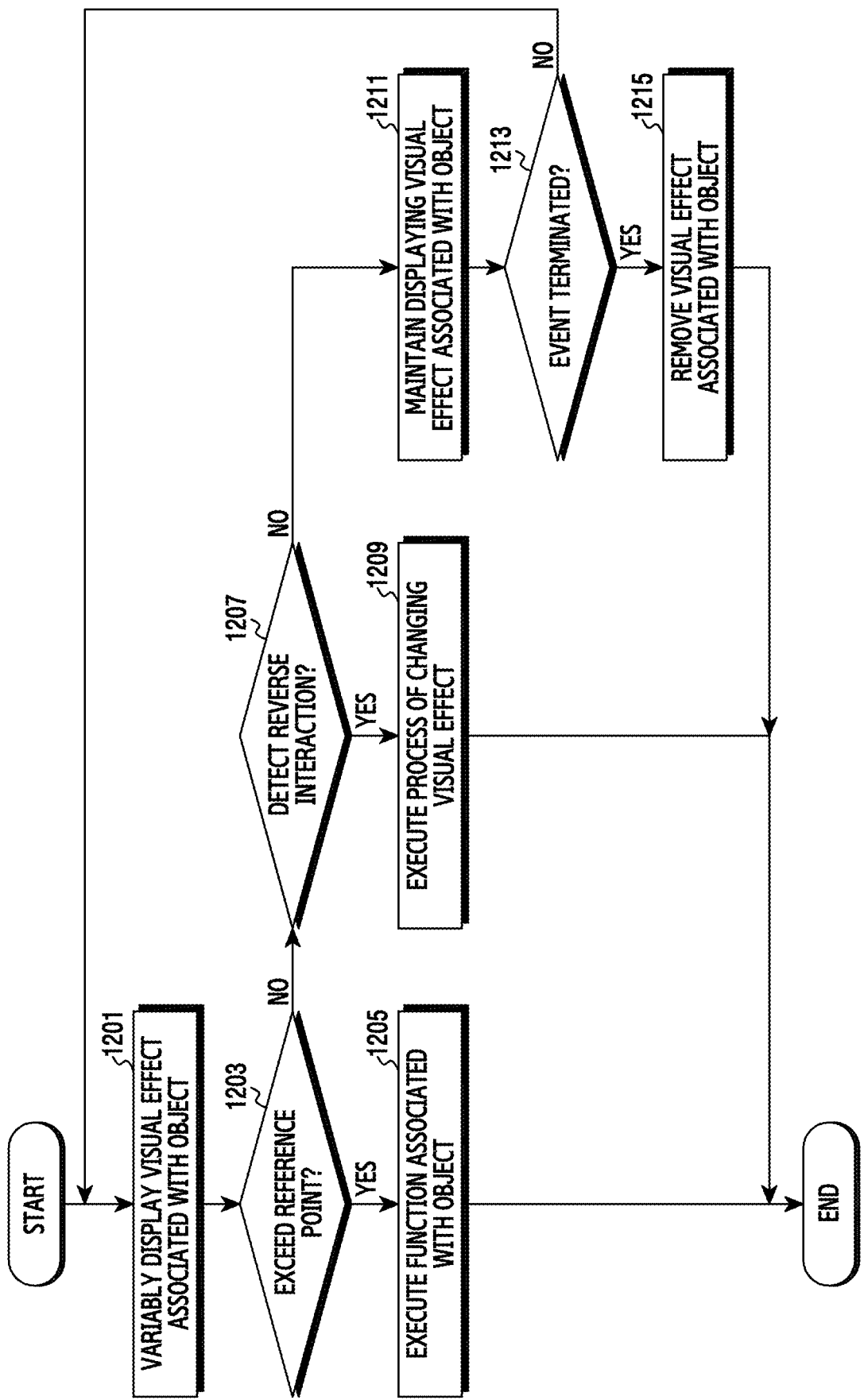
FIG. 12 is a flowchart of a method of providing a visual effect using a bezel-based interaction in an electronic device, according to an embodiment of the present disclosure.

FIG. 12 is a flowchart of a method of providing a visual effect using a bezel-based interaction in an electronic device, according to an embodiment of the present disclosure.

Referring to FIG. 12, at step 1201, the controller 180 of the electronic device 100 variably displays a visual effect associated with an object. Step 1201 may be performed after step 207 of FIG. 2. When two objects are displayed at step 203 of FIG. 2, an object that is to provide a visual effect may be determined by steps 205 and 207 of FIG. 2. Step 1201 may be same as or similar to step 209 of FIG. 2. Hereinafter, descriptions will be provided from the perspective of an example in which the object determined at step 1201 is an object (e.g., call connection) executed by a clockwise rotation.

At step 1203, the controller 180 may determine whether the displayed visual effect exceeds a reference point (or a reference line). Step 1203 is the same as or similar to step 211 of FIG. 2.

When the visual effect exceeds the reference point, the controller 180 performs step 1205. When the visual effect does not exceed the reference point, the controller 180 performs step 1207.

When the visual effect exceeds the reference point, the controller 180 executes a function associated with the object at step 1205. When the object is a call connection button, the controller 180 may connect a call with a caller of an external electronic device. When the call is connected with the caller, the controller 180 may display a user interface associated with a call connection (e.g., the user interface 450 of FIG. 4A).

When the visual effect does not exceed the reference point, the controller 180 determines whether a reverse interaction is detected at step 1207. The reverse interaction indicates an input that is detected in the opposite direction of the direction detected at step 1201. As described above, an interaction that rotates clockwise is detected at step 1201. In this instance, the reverse interaction is an input that rotates counterclockwise.

When the reverse interaction is detected, the controller 180 performs step 1209. When the reverse interaction is not detected, the controller 180 performs step 1211.

When the reverse interaction is detected, the controller 180 performs a process of changing a visual effect at step 1209. For example, the controller 180 may display the visual effect associated with the object in a small size, as the reverse interaction is detected. The process of changing the visual effect may include changing the visual effect associated with the object, removing the visual effect, variably displaying a visual effect associated with another object, determining whether the visual effect associated with the other object exceeds a reference point, and executing a function associated with the other object. That is, the process of changing the visual effect may include steps 911 to 917 of FIG. 9.

When the reverse interaction is not detected, the controller 180 maintains display of the visual effect associated with the object at step 1211. That is, the controller 180 may maintain the visual effect displayed at step 1201. Step 1211 may maintain the visual effect displayed at step 1201 without changing at least one of the size, the shape, the transparency, and the color of the visual effect.

At step 1213, the controller 180 determines whether the event is terminated. For example, when the call connection of a call from the external electronic device is terminated, or when an alarm time (or an alarm notification time) elapses, the controller 180 may determine that the event is terminated.

When the event is terminated, the controller 180 performs step 1215. When the event is not terminated, the controller 180 returns to step 1201.

When the event is terminated, at step 1215, the controller 180 removes the visual effect associated with the object. The controller 180 may remove a user interface associated with a call (e.g., the first user interface 410), and may return to a background screen or a screen displayed before a call is received (e.g., an application execution screen). Alternatively, the controller 180 may remove a user interface associated with an alarm (e.g., the first user interface 510), and may return to a background screen or a screen displayed before an alarm rings (e.g., an application execution screen).

The controller 180 may determine whether a bezel-based interaction is not detected any longer at step 1213. When the bezel-based interaction is not detected any longer, the controller 180 may perform step 1211 until the event is terminated, or when the bezel-based interaction is not detected during a predetermined period of time, the controller 180 may perform step 1215.

The various embodiments of the present disclosure may be implemented in a recording medium, which can be read through a computer or a similar device, by using software, hardware, or a combination thereof. According to the hardware implementation, the embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

According to embodiments of the present disclosure, a recording medium may include a computer-readable recording medium, wherein a program is recorded to execute operations of detecting an event; detecting an interaction by a rotating input module; determining an object associated with the event based on the interaction; and variably displaying a visual effect associated with the object.

The embodiments disclosed in the present specifications and drawings are provided merely to readily describe and to help a thorough understanding of the present disclosure, but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure, which is defined not by the detailed description and embodiments, but by the appended claims and their equivalents.

What is claimed is:

1. An electronic device, comprising:
a rotating input module;
a display; and
a processor configured to:
detect an event,
detect an interaction by the rotating input module,
determine a first object associated with the event based on the interaction, and
display, on the display, a visual effect associated with the first object,
wherein the processor is further configured to increase a size of the visual effect associated with the first object as a rotation angle by which the rotating input module is rotated is increased, and
wherein the processor is further configured to execute a function associated with the first object in response to the visual effect associated with the first object exceeding a reference point.

2. The electronic device of claim 1, wherein the processor is configured to display the visual effect associated with the first object by varying at least one of a size, a shape, a transparency, and a color of the visual effect based on the interaction.

3. The electronic device of claim 1, wherein the rotating input module is formed on a bezel part that encloses an edge of the display, to be rotatable.

4. The electronic device of claim 1, wherein the interaction is a user input that rotates the rotating input module clockwise or counterclockwise.

5. The electronic device of claim 1, wherein the reference point corresponds to an area located at a distance from a side of the display.

6. The electronic device of claim 1, wherein the processor is further configured to display, on the display, information associated with the event.

7. The electronic device of claim 1, wherein the processor is further configured to display, on the display, a second object in a location opposite a location of the first object.

8. The electronic device of claim 7, wherein the first and the second object are disposed on a left side and a right side or an upper side and a lower side of the displayed information.

9. The electronic device of claim 1, wherein, when an interaction, which rotates in a second direction that is opposite to a first direction, is detected while the visual effect associated with the first object is variably displayed according to an interaction that rotates in the first direction, the processor is further configured to change the visual effect associated with the first object.

10. The electronic device of claim 9, wherein the processor is further configured to remove the visual effect associated with the first object, and variably display a visual effect associated with the second object according to the interaction that rotates in the second direction.

11. The electronic device of claim 9, wherein the processor is further configured to variably display, on the display, the visual effect associated with the first object and the visual effect associated with the second object according to the interaction that rotates in the second direction.

12. The electronic device of claim 10, wherein, when the visual effect associated with the second object exceeds a reference point, the processor is further configured to execute a function associated with the second object.

13. An operation method of an electronic device including a rotating input module, the method comprising:
    detecting an event;
    detecting an interaction by the rotating input module;
    determining a first object associated with the event based on the interaction;
    displaying a visual effect associated with the first object;
    increasing a size of the visual effect associated with the first object as a rotation angle by which the rotating input module is rotated is increased; and
    executing a function associated with the first object in response to the visual effect associated with the first object exceeding a reference point.

14. The method of claim 13, wherein displaying the visual effect associated with the first object comprises displaying the visual effect associated with the first object by varying at least one of a size, a shape, a transparency, and a color of the visual effect according to the interaction.

15. The method of claim 13, wherein the interaction is a user input that rotates the rotating input module clockwise or counterclockwise.

16. The method of claim 13, wherein the reference point corresponds to an area located at a distance from a side of a display of the electronic device.

17. The method of claim 13, further comprising displaying information associated with the event.

18. The method of claim 13, further comprising changing the visual effect associated with the first object when an interaction, which rotates in a second direction that is opposite to a first direction, is detected while the visual effect associated with the first object is variably displayed according to an interaction that rotates in the first direction.

19. The method of claim 18, further comprising:
    removing the visual effect associated with the first object; and
    variably displaying a visual effect associated with a second object according to the interaction that rotates in the second direction.

20. The method of claim 19, further comprising executing a function associated with the second object when the visual effect associated with the second object exceeds a reference point.

* * * * *